US 9,409,573 B2

(12) United States Patent
Seki

(10) Patent No.: US 9,409,573 B2
(45) Date of Patent: Aug. 9, 2016

(54) VEHICLE SPEED DETERMINATION SYSTEM, STABILITY CONTROL SYSTEM, AND SADDLED VEHICLE HAVING THE SAME

(71) Applicant: YAMAHA HATSUDOKI KABUSHIKI KAISHA, Iwata-shi (JP)

(72) Inventor: Yoshimichi Seki, Iwata (JP)

(73) Assignee: YAMAHA HATSUDOKI KABUSHIKI KAISHA, Iwata-Shi (JP)

( * ) Notice: Subject to any disclaimer, the term of this patent is extended or adjusted under 35 U.S.C. 154(b) by 0 days.

(21) Appl. No.: 14/513,778

(22) Filed: Oct. 14, 2014

(65) Prior Publication Data

US 2015/0105938 A1   Apr. 16, 2015

(30) Foreign Application Priority Data

Oct. 15, 2013   (JP) ................. 2013-214463

(51) Int. Cl.
*B60W 30/02*    (2012.01)
*B60W 30/045*   (2012.01)
(Continued)

(52) U.S. Cl.
CPC ............ *B60W 30/02* (2013.01); *B60W 30/045* (2013.01); *B60W 30/18145* (2013.01); *B60W 30/18172* (2013.01); *B60W 40/10* (2013.01); *G01P 3/04* (2013.01); *G01P 13/02* (2013.01); *B60W 2030/043* (2013.01); *B60W 2300/36* (2013.01); *B60W 2520/10* (2013.01); *B60W 2520/125* (2013.01); *B60W 2520/14* (2013.01);

(Continued)

(58) Field of Classification Search
CPC ............. B60W 30/02; B60W 30/045; B60W 30/18145; B60W 30/1872; B60W 40/10
USPC ............................................ 701/1
See application file for complete search history.

(56) References Cited

U.S. PATENT DOCUMENTS

| 2012/0259526 A1* | 10/2012 | Inoue ............. B60W 40/112 701/70 |
| 2013/0245900 A1* | 9/2013 | Fukushima ......... B60W 40/112 701/51 |
| 2014/0200780 A1* | 7/2014 | Watanabe ............ B60T 8/1706 701/68 |

FOREIGN PATENT DOCUMENTS

| EP | 2517941 A1 | 10/2012 |
| EP | 2641819 A1 | 9/2013 |

(Continued)

OTHER PUBLICATIONS

Extended European Search Report dated Mar. 10, 2015.

*Primary Examiner* — Fadey Jabr
*Assistant Examiner* — Yazan A Soofi
(74) *Attorney, Agent, or Firm* — Rabin & Berdo, P.C.

(57) ABSTRACT

A vehicle speed while curving through steering maneuver is determined. A vehicle speed determination system is applicable to a vehicle having a front wheel and a rear wheel. The system includes: a wheel speed sensor configured to detect a wheel speed $V_f$ of the front wheel; and an arithmetic circuit configured to determine a vehicle speed V(r) at a rear-wheel tangential point, based on a difference in vehicle speed between the front-wheel tangential point and the rear-wheel tangential point which occurs due to a difference between a locus of travel of the front wheel and a locus of travel of the rear wheel, and on the wheel speed $V_f$ of the front wheel.

19 Claims, 15 Drawing Sheets

(51) Int. Cl.
*B60W 30/18* (2012.01)
*G01P 3/04* (2006.01)
*G01P 13/02* (2006.01)
*B60W 40/10* (2012.01)
*B60W 30/04* (2006.01)

(52) U.S. Cl.
CPC ........ *B60W2520/18* (2013.01); *B60W 2520/20* (2013.01); *B60W 2520/26* (2013.01); *B60W 2520/263* (2013.01); *B60Y 2200/12* (2013.01)

(56) References Cited

FOREIGN PATENT DOCUMENTS

| | | |
|---|---|---|
| JP | 05-008744 A | 1/1993 |
| JP | 2002-316629 A | 10/2002 |
| JP | 2008-126988 A | 6/2008 |
| JP | 2011-0128093 A | 6/2011 |
| WO | WO 2013-014945 A1 | 1/2013 |

* cited by examiner

FIG.14
(a)
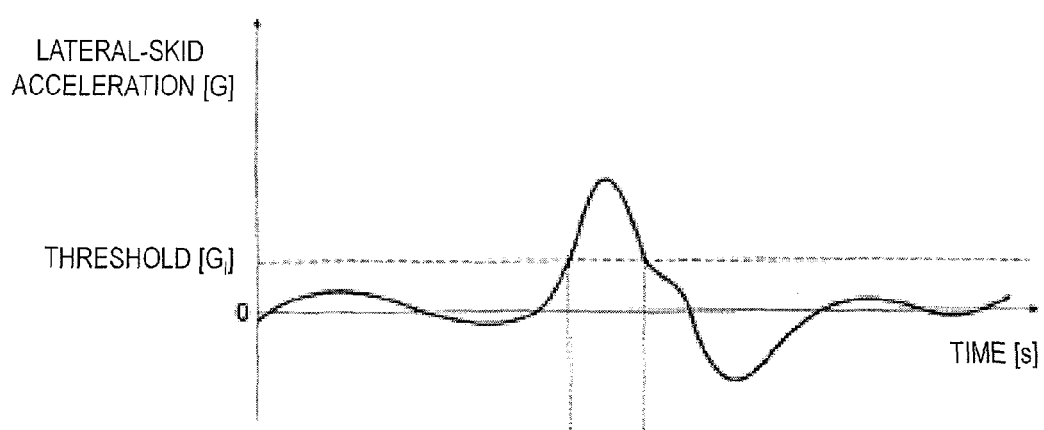
(b)
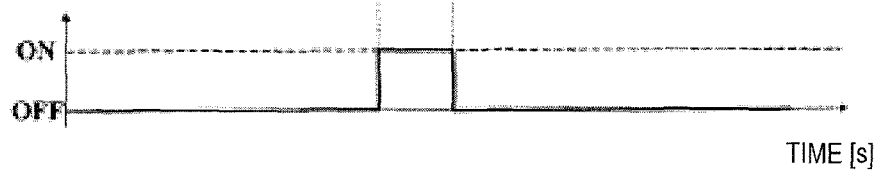

VEHICLE SPEED DETERMINATION SYSTEM, STABILITY CONTROL SYSTEM, AND SADDLED VEHICLE HAVING THE SAME

BACKGROUND

1. Technical Field

The present invention relates to a vehicle speed determination system for a vehicle which banks while curving, a stability control system for such a vehicle, and a saddled vehicle incorporating the same.

2. Description of the Related Art

In attitude control techniques (vehicle stability control techniques) for motorcycles, such as a traction control system (TCS) and an anti-lock braking system (ABS), it is commonplace to utilize a "slip amount" or "slip rate" of wheels which is obtained from a difference in wheel speed between the front wheel and the rear wheel.

A slip rate $\lambda$ is typically expressed by the following equations.

$$\lambda = (V - V_r)/V \quad \text{during braking}$$

$$\lambda = (V - V_r)/V_r \quad \text{during driving}$$

A slip amount can be expressed as $(V - V_r)$, for example.

Herein, V is a vehicle speed, and $V_r$ is a wheel speed of the rear wheel (driving wheel). Generally speaking, a "vehicle speed" is a moving velocity of a vehicle with respect to the road surface. A "wheel speed" is a velocity in a tangential direction on the outer peripheral surface of a wheel, as referenced to the rotation axis of the wheel. A wheel speed is proportional to "the rotation speed (revolutions per unit time) of the wheel" and "the rotating radius of the wheel", and generally expressed as a product of the "rotational angular velocity of the wheel" and "the rotating radius of the wheel". The unit of wheel speed may be "km/hour", for example, although not being limited thereto. According to the above equations, when the vehicle speed V is equal to the wheel speed $V_r$ of the rear wheel, the slip rate $\lambda$ and the slip amount will equal zero.

As an attitude control technique (vehicle stability control technique) for motorcycles, Japanese Laid-Open Patent Publication No. 2008-126988 (hereinafter "Patent Document 1") discloses a brake fluid pressure controlling apparatus for motorcycles. This controlling apparatus includes wheel speed sensors for detecting the respective wheel speeds of the front and rear wheels, and controls a braking force adjustor based on the wheel speed detected by each wheel speed sensor.

In attitude control techniques (vehicle stability control techniques) for motorcycles, conventionally, vehicle speed is acquired by detecting the wheel speed of the front wheel, which is not a driving wheel. Specifically, given a wheel speed $V_f$ of the front wheel, it is assumed that $V = V_f$; then, a measured value of the wheel speed $V_f$ of the front wheel is substituted for the vehicle speed V in the aforementioned equations for calculating a slip rate or a slip amount.

Moreover, the controlling apparatus of Patent Document 1 includes wheel speed sensors for detecting the respective wheel speeds of the front and rear wheels, and controls a braking force adjustor based on the wheel speed detected by each wheel speed sensor. In this controlling apparatus, a vehicle speed is estimated from a front-wheel wheel speed which is detected by the wheel speed sensor for the front wheel. The brake fluid pressures of the braking devices are adjusted in accordance with a speed difference between this estimated vehicle speed and a rear-wheel wheel speed which is detected by the wheel speed sensor for the rear wheel.

Thus, under the conventional techniques, the vehicle speed V is a measured wheel speed value of the front wheel, or an estimated value based on the wheel speed of the front wheel. The aforementioned methods of determining the vehicle speed V are both based on the premise that the vehicle body is traveling straight. However, a saddled vehicle is capable of banking while curving.

SUMMARY

The present invention provides a vehicle speed determination system and a stability control system which can solve the aforementioned problems, and a saddled vehicle incorporating the same.

A vehicle speed determination system according to the present invention is a vehicle speed determination system for a vehicle having a front wheel and a rear wheel, comprising: a wheel speed sensor configured to detect a wheel speed of the front wheel; and an arithmetic circuit configured to determine a vehicle speed at a rear-wheel tangential point, based on a difference in vehicle speed occurring between a front-wheel tangential point and the rear-wheel tangential point due to a difference between a locus of travel of the front wheel and a locus of travel of the rear wheel, and on a wheel speed of the front wheel.

Based on the above construction, even when a wheel speed of the front wheel does not match a vehicle speed at a rear-wheel tangential point due to an "inner-outer difference between the wheels" while curving, a vehicle speed determination system according to the present invention is able to determine a vehicle speed at the rear-wheel tangential point from the wheel speed of the front wheel, based on a difference in vehicle speed occurring between the front-wheel tangential point and the rear-wheel tangential point. This allows to provide a vehicle speed determination system which is capable of estimating a vehicle speed during a curve in particular.

A stability control system according to the present invention is a stability control system for a vehicle having a front wheel and a rear wheel, the stability control system comprising: a first wheel speed sensor configured to detect a wheel speed of the front wheel; a second wheel speed sensor configured to detect a wheel speed of the rear wheel; an arithmetic circuit configured to determine vehicle speeds at a front-wheel tangential point and a rear-wheel tangential point, based on a difference in vehicle speed occurring between the front-wheel tangential point and the rear-wheel tangential point due to a difference between a locus of travel of the front wheel and a locus of travel of the rear wheel, and on a wheel speed of the front wheel; and a longitudinal force controller configured to adjust an absolute value of a longitudinal force based on the vehicle speeds at the front-wheel tangential point and the rear-wheel tangential point, the longitudinal force being a sum of forces along a front-rear direction acting on the front wheel or the rear wheel.

Based on the above construction, even when a wheel speed of the front wheel does not match a vehicle speed at a rear-wheel tangential point due to an "inner-outer difference between the wheels" while curving, a stability control system according to the present invention is able to determine a vehicle speed at the rear-wheel tangential point from the wheel speed of the front wheel, based on a difference in vehicle speed occurring between the front-wheel tangential point and the rear-wheel tangential point. Furthermore, it includes a longitudinal force controller which adjusts an absolute value of the longitudinal force based on a vehicle speed at the rear-wheel tangential point determined in this manner. This allows to provide a stability control system which is capable of estimating a vehicle speed during a curve in particular.

A saddled vehicle according to the present invention comprises the above stability control system.

A saddled vehicle according to the present invention includes the above stability control system. This allows to provide a saddled vehicle including a stability control system which is capable of estimating a vehicle speed during a curve in particular.

With a vehicle speed determination system according to the present invention, even if a wheel speed difference occurs between the front and rear wheels due to a difference in the loci of the tangential points of the front wheel and the rear wheel on the road surface (loci of travel), a vehicle speed at the rear-wheel tangential point can be determined from the wheel speed of the front wheel through arithmetic operations. Thus, by applying the vehicle speed determination system of the present invention to a stability control system for a vehicle, it is possible to realize vehicle control based on vehicle speeds at the tangential points of the respective wheels, without being influenced by any inner-outer difference between the front and rear wheels.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 14 includes (a) a graph illustrating detection of lateral-skid acceleration according to an embodiment, and (b) a graph illustrating longitudinal-force reduction control with respect to the detected lateral-skid acceleration.

DETAILED DESCRIPTION

The inventors have found that, when a motorcycle travels with a large steering angle, the slip rate (slip amount) thereof may take a non-zero calculated value even though no slip is actually occurring. The inventors have conducted vigorous studies to ascertain the cause of this to be the following. During travel with a large steering angle, an "inner-outer difference between the wheels" occurs that is associated with a difference in "locus" as traveled by the tangential points of the front wheel and the rear wheel, whereby the front-wheel wheel speed may exhibit a greater value than the rear-wheel wheel speed. This may cause the slip rate (slip amount) to deviate from the actual value. The basis for this problem in motorcycles is that the moving velocity of a vehicle in any motion which involves a pivot motion cannot be defined with a single value, but rather may take different values at different sites on the vehicle. In other words, in a motorcycle which travels while curving, the vehicle speed at the tangential point of the front wheel may not always match the vehicle speed at the tangential point of the rear wheel. Therefore, any conventional technique that is based on the premise that the vehicle speed at a front-wheel tangential point is always equal to the vehicle speed at a rear-wheel tangential point may produce a non-zero calculated value of slip rate (slip amount) when no slip is in fact occurring.

Figure 1A:
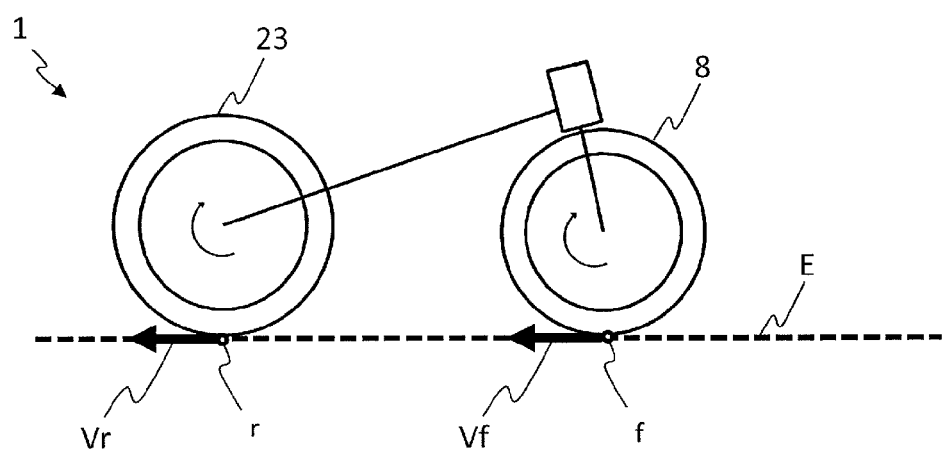
FIGS. 1A and 1B are diagrams for explaining wheel speeds of the front and rear wheels of a motorcycle.
Figure 1B:
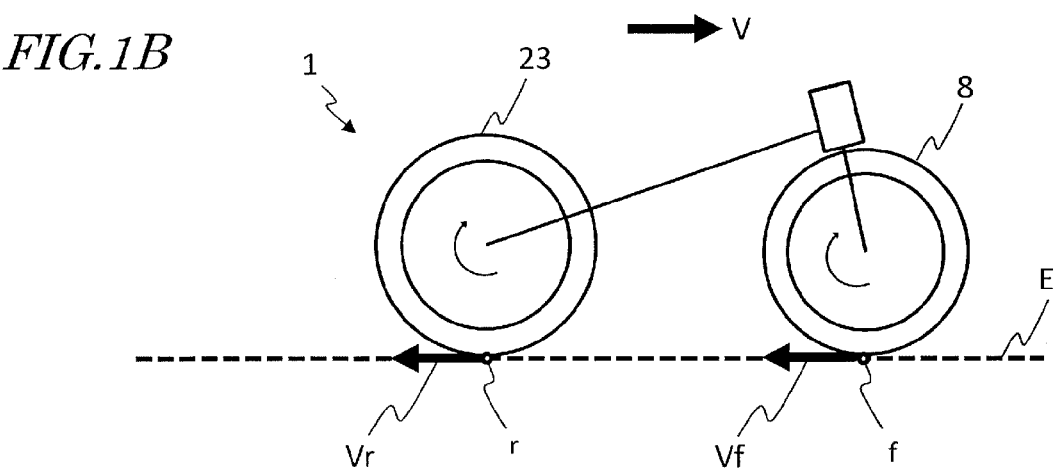

Hereinafter, the cause for the aforementioned problem of conventional techniques will be described in detail, with reference to FIGS. 1A and 1B and FIG. 2. FIGS. 1A and 1B are diagrams schematically showing the basic construction of a motorcycle 1. Portions (a) to (c) of FIG. 2 are upper plan views schematically showing loci of travel of the front wheel and the rear wheel of the motorcycle 1.

As shown in FIG. 1A, the motorcycle 1 includes a front wheel 8 and a rear wheel 23. The front wheel 8 is in contact with the road surface E at a front-wheel tangential point f, while the rear wheel 23 is in contact with the road surface E at a rear-wheel tangential point r. In this example, the rear wheel 23 is a driving wheel which rotates by receiving driving force from a driving source such as an engine, an electric motor, etc., that is not shown herein. On the other hand, the front wheel 8 rotates due to the frictional force received from the road surface E.

In the example shown in FIGS. 1A and 1B, the motorcycle 1 moves in the right direction in the figure at a vehicle speed V, due to rotation of the rear wheel 23. When the motorcycle 1 is traveling straight along a straight line on the road surface E, the vehicle speed V is equal to the wheel speed $V_f$ of the front wheel 8. If the rear wheel 23 is undergoing no slip at this time, the vehicle speed V is also equal to the wheel speed $V_r$ of the rear wheel 23. With travel of the motorcycle 1, the front-wheel tangential point f and the rear-wheel tangential point r will move along the road surface E.

Figure 2:
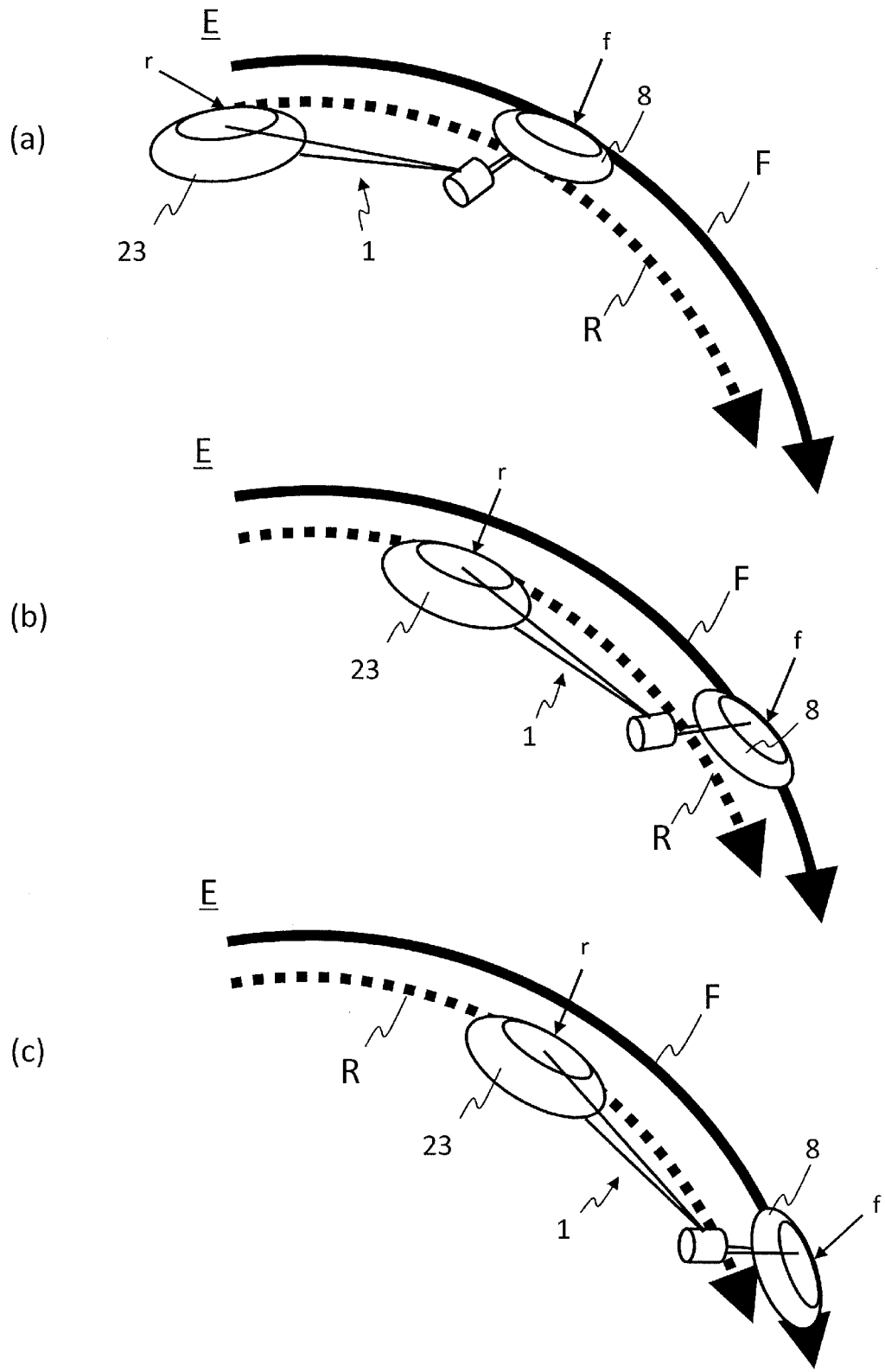
FIG. 2 includes upper plan views (a) to (c) schematically showing a locus of travel when a motorcycle curves while being banked.

Next, FIG. 2, (a) to (c) will be referred to. In each of (a) to (c) of FIG. 2, instances of two loci of travel F and R and the front wheel 8 and the rear wheel 23 of the motorcycle 1, which is banked relative to the road surface E, are schematically shown. In three steps, FIG. 2(a), FIG. 2(b), and FIG. 2(c) schematically illustrate the motorcycle 1 undergoing a process of curving while banking. Since the motorcycle 1 travels while pivoting around an axis which is perpendicular to the road surface E, the yaw rate of the motorcycle 1 exhibits non-zero values at this time. As used herein, a yaw rate is a rate of change of the yaw angle (gyration angle) over time, and is also referred to as a yaw angular velocity. As will be later described with reference to FIG. 13, the yaw rate is defined as a time derivative of an angle around the Z axis, which is the fixed axis of the vehicle body.

In the present specification, a "locus of travel of the front wheel" means a locus of the front-wheel tangential point f on the road surface E, whereas a "locus of travel of the rear wheel" means a locus of the rear-wheel tangential point r on the road surface E. For simplicity, the road surface E is approximated to be a "plane" in the figure; however, the road surface E is not limited to a plane.

As shown in FIG. 2, (a) to (c), when there is a difference between the locus of travel F of the front wheel 8 and the locus of travel R of the rear wheel 23, a difference may also occur between the moving velocity of the front-wheel tangential point f and the moving velocity of the rear-wheel tangential point r respectively moving along the loci of travel F and R. This is because the distance of movement of the front-wheel tangential point f and the distance of movement of the rear-wheel tangential point r, in unit time, may differ from each other. In the present specification, the moving velocity of the front-wheel tangential point f may be referred to as the "vehicle speed at the front-wheel tangential point", whereas the moving velocity of the rear-wheel tangential point r may be referred to as the "vehicle speed at the rear-wheel tangential point". The reason is that, strictly speaking, the vehicle speed of a motorcycle which is curving while banking may have different values at different sites on the vehicle. In the present specification, vehicle speed may be denoted as V(x), i.e., a function of site x on the vehicle. For example, the "vehicle speed at the front-wheel tangential point" may be denoted as V(f), and the "vehicle speed at the rear-wheel tangential point" as V(r).

While the motorcycle 1 is moving straight along the straight line on the road surface E, the front-wheel tangential point f and the rear-wheel tangential point r will move along the same straight line, with the locus of travel F of the front wheel 8 matching the locus of travel R of the rear wheel 23. As a result, the vehicle speed V(f) at the front-wheel tangential point f is equal to the vehicle speed V(r) at the rear-wheel tangential point r. This has been the conventional premise for detecting the vehicle speed V(f) at the front-wheel tangential point f through measurement, and then calculating a slip rate or the like of the rear wheel by using this detected value as the vehicle speed V(r) at the rear-wheel tangential point r. Therefore, when a discrepancy between the loci of travel F and R occurs between the front and rear wheels as shown in FIG. 2, the vehicle speed V(r) at the rear-wheel tangential point r may significantly deviate from its true value, thus inducing a large error in the slip rate (slip amount). This has led to premature intervention or lagged intervention of slip controls, such as TCS, ABS, etc., in the conventional vehicle attitude control systems.

Figure 3:
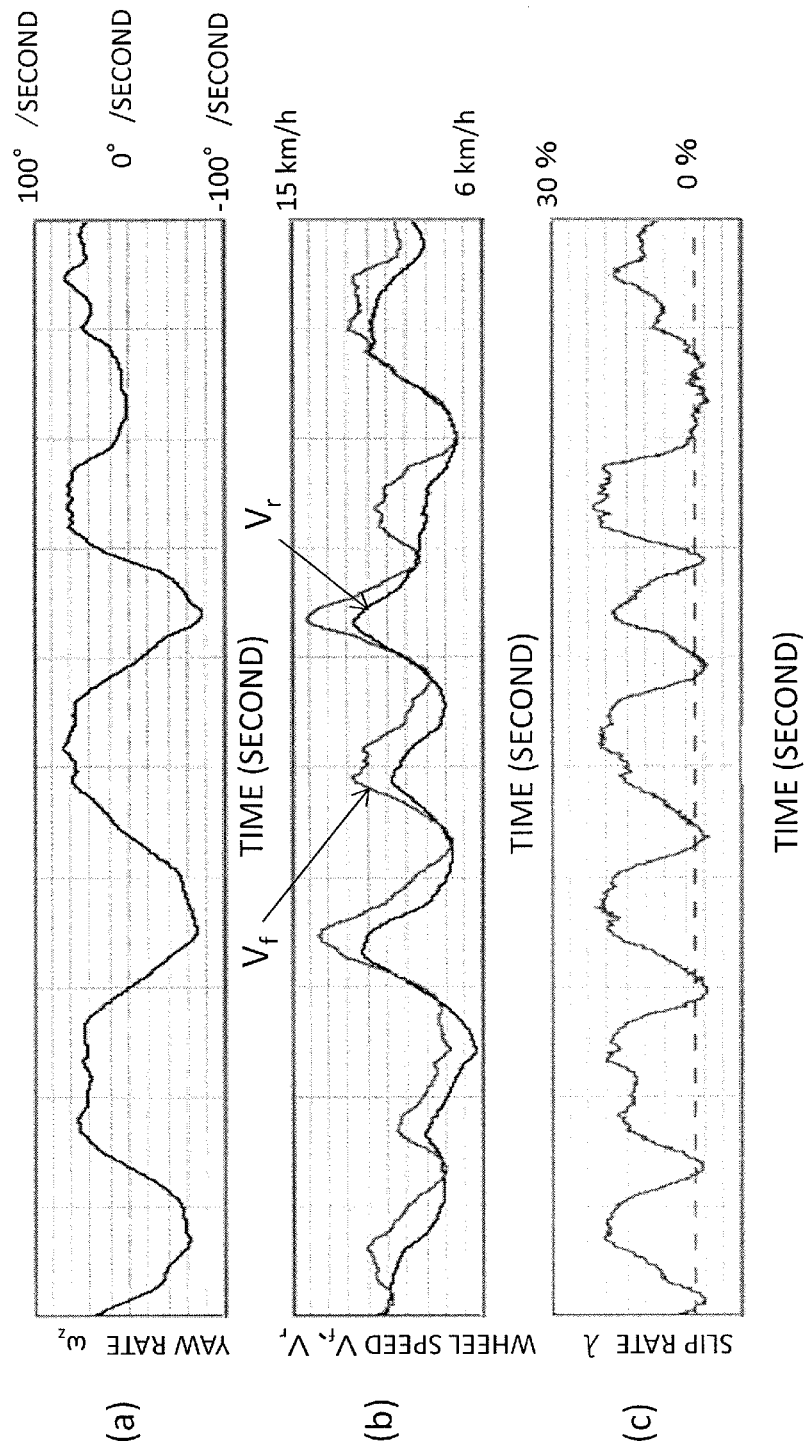
FIG. 3 includes graphs showing temporal change of: (a) a yaw rate $\omega_z$ of a motorcycle which travels in a meandering manner with steering maneuver; (b) wheel speeds $V_f$ and $V_r$ of the front and rear wheels at that time; and (c) a slip rate $\lambda$ determined by a conventional technique.

FIG. 3(a) is a graph showing temporal change of the yaw rate $\omega_z$ during travel in a slalom manner which involves steering maneuver; FIG. 3(b) is a graph showing temporal change of the front-wheel wheel speed $V_f$ and the rear-wheel wheel speed $V_r$ at that time; and FIG. 3(c) is a graph showing temporal change of the slip rate $\lambda$ as obtained through a calculation in which the front-wheel wheel speed $V_f$ shown in FIG. 3(b) is regarded as the vehicle speed V(r) at the rear-wheel tangential point. The yaw rate $\omega_z$, the front-wheel wheel speed $V_f$, and the rear-wheel wheel speed $V_r$ are all actually-measured values.

As shown in FIG. 3(a), the yaw rate $\omega_z$ varies in a range from about −70°/second to about 70°/second. It can be seen from FIG. 3(b) that, as the absolute value of the yaw rate $\omega_z$ increases, the difference $(V_f − V_r)$ between the front-wheel wheel speed $V_f$ and the rear-wheel wheel speed $V_r$ increases. Specifically, at the maximum, the difference $(V_f − V_r)$ reached 2.5 km/hour or more. The slip rate $\lambda$ in FIG. 3(c) was calculated by substituting the measured value of the front-wheel wheel speed $V_f$ and the actually-measured value of the rear-wheel wheel speed $V_r$ of FIG. 3(b) into the equation $\lambda = (V_f − V_r)/V_f$.

The slip rate $\lambda$ of FIG. 3(c) thus obtained does not reflect the actual slip rate, but instead indicates an excessively large value (about 20% at the maximum). This is because, when the yaw rate $\omega_z$ increases during a slalom travel, the front-wheel wheel speed $V_f$ will increase over the rear-wheel wheel speed $V_r$ even though the rear wheel may not be undergoing a slip. The reason why the front-wheel wheel speed $V_f$ and the rear-wheel wheel speed $V_r$ do not match during a slalom travel is that, as mentioned earlier, the front wheel and the rear wheel have different loci of travel.

During travel while curving with such intentional steering maneuver, the yaw rate $\omega_z$ greatly varies with the changing attitude of the vehicle, thus inducing a difference between the front-wheel wheel speed $V_f$ and the rear-wheel wheel speed $V_r$ with the yaw rate $\omega_z$. Therefore, by acquiring the yaw rate $\omega_z$ through detection or estimation, it becomes possible to estimate the vehicle speed V(r) at the rear-wheel tangential point from the wheel speed $V_f$ of the front wheel, on the basis of the yaw rate $\omega_z$.

The inventors first found that the following relationship exists between the front-wheel wheel speed $V_f$ and the vehicle speed V(r) at the rear-wheel tangential point via the yaw rate $\omega_z$, where the bank angle $\phi$ is ignored: a value obtained by subtracting a square of V(r) from a square of $V_f$ is proportional to a square of the yaw rate $\omega_z$. It was also found that the proportionality constant depends on the vehicle size. Accordingly, once measured values of the front-wheel wheel speed $V_f$ and the yaw rate $\omega_z$ are provided, it becomes possible to estimate the vehicle speed V(r) at the rear-wheel tangential point through arithmetic operations.

Figure 4:
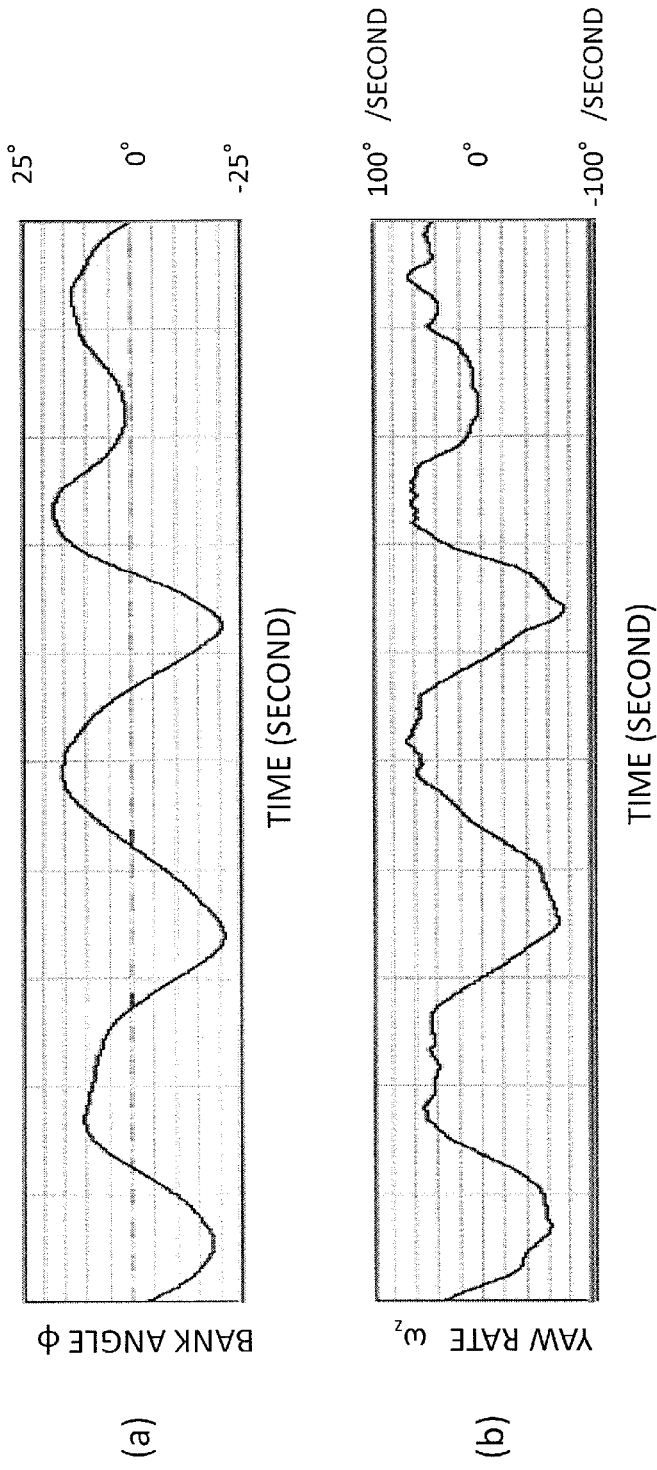
FIG. 4 includes graphs showing temporal change of: (a) a bank angle $\phi$ of a motorcycle which travels in a meandering manner with steering maneuver; and (b) a yaw rate $\omega_z$ at that time.

Note that, during a slalom travel, the bank angle (roll angle) $\phi$ will also change over time, with the changing attitude of the vehicle. FIG. 4(a) is a graph showing temporal change of the bank angle φ during a slalom travel which involves steering maneuver; and FIG. 4(b) is a graph showing temporal change of the yaw rate $\omega_z$ at that time. FIG. 4(b) corresponds to FIG. 3(a).

As can be seen from FIG. 4(a) and FIG. 4(b), during a slalom travel which involves steering maneuver, the bank angle φ shows similar temporal change to those of the yaw rate $\omega_z$, and varies within a range of ±25°. However, some difference exists between the bank angle φ and the yaw rate $\omega_z$. In order to grasp the motion and changes in attitude of the vehicle, it would be effective to acquire both of the yaw rate $\omega_z$ and bank angle φ values. In fact, even under the same yaw rate $\omega_z$, different bank angles φ will affect the difference in vehicle speed between the front- and rear-wheel tangential points, which in itself is ascribable to the different loci of the front and rear wheels. By grasping the motion and changes in attitude (attitude angle value) of the vehicle, it becomes possible to determine the vehicle speed V(r) at the rear-wheel tangential point from a front-wheel wheel speed $V_f$ which is obtained through measurement, with a high accuracy.

The influence of the bank angle φ can be previously ascertained through calculation, experimentation, simulation, etc. The inventors have found that the influence of the bank angle φ can be corrected for by multiplying the yaw rate $\omega_z$ with a function f(φ) of bank angle φ. Although f(φ) is dependent on the size of the saddled vehicle (e.g., the distance between the front-wheel tangential point and the rear-wheel tangential point) as is clear from the aforementioned reasons, it can be known through calculation, experimentation, simulation, etc.

Thus, the vehicle speed V(r) at the rear-wheel tangential point can be determined with the following general formula, by using the yaw rate $\omega_z$ and the bank angle φ.

$$V(r) = \sqrt{V_f^2 - (f(\phi) \cdot \omega_z)^2} \qquad [\text{eq. 1}]$$

Thus, according to the present invention, when there is a difference between the locus of travel F of the front wheel 8 and the locus of travel R of the rear wheel 23, such that a difference in vehicle speed occurs between the front-wheel tangential point f and the rear-wheel tangential point r, this difference in vehicle speed is considered in determining the vehicle speed V(r) at the rear-wheel tangential point r. That is, rather than regarding a detected wheel speed $V_f$ of the front wheel 8 intactly as the vehicle speed V, the detected wheel speed $V_f$ of the front wheel 8 is subjected to arithmetic operations to determine a vehicle speed V(r) at the rear-wheel tangential point r, and this determined value of the V(r) (estimated value) is subjected to arithmetic operations to determine a slip rate or the like.

Note that, when the yaw rate is substantially zero (when equal to or less than a predetermined reference value), the wheel speed $V_f$ of the front wheel may be regarded as the vehicle speed V(r) at the rear-wheel tangential point, without employing the calculation of eq. 1 above.

Next, an exemplary basic construction of the vehicle speed determination system according to the present invention will be described.

This vehicle speed determination system is: a vehicle speed determination system for a vehicle having a front wheel and a rear wheel, the system including a wheel speed sensor for detecting a wheel speed of the front wheel and an arithmetic circuit for determining a vehicle speed at a rear-wheel tangential point. The arithmetic circuit determines a vehicle speed at the rear-wheel tangential point, based on a difference in vehicle speed between the front-wheel tangential point and the rear-wheel tangential point which occurs due to a difference between a locus of travel of the front wheel and a locus of travel of the rear wheel, and on the wheel speed of the front wheel. In order to determine a vehicle speed at the rear-wheel tangential point from the wheel speed of the front wheel as detected by the wheel speed sensor for the front wheel, this arithmetic circuit relies on a difference in vehicle speed between the front-wheel tangential point and the rear-wheel tangential point, which occurs due to a difference between a locus of travel of the front wheel and a locus of travel of the rear wheel.

Note that a difference in vehicle speed occurring between the front-wheel tangential point and the rear-wheel tangential point can be assessed by various methods. For example, an image sensor which images tangential points of the front and rear wheels on the road surface during travel may be provided, and an image which is obtained by the image sensor may be processed by an image processor, thus actually detecting a difference between the locus of travel of the front wheel and the locus of travel of the rear wheel. A "difference in vehicle speed" not only means the straightforward difference between the vehicle speed at the front-wheel tangential point and the vehicle speed at the rear-wheel tangential point, but may also encompass a difference between a square of "the vehicle speed at the front-wheel tangential point" and a square of "the vehicle speed at the rear-wheel tangential point", for example.

In one embodiment of the present invention, the arithmetic circuit is configured to determine a difference in vehicle speed occurring between the front-wheel tangential point and the rear-wheel tangential point based on a yaw rate of the vehicle. Once the yaw rate is known, it becomes possible to assess a difference in vehicle speed occurring between the front-wheel tangential point and the rear-wheel tangential point. In order to assess a difference in vehicle speed occurring between the front-wheel tangential point and the rear-wheel tangential point, as described above, it is effective to acquire information concerning the bank angle φ of the vehicle. Therefore, in another embodiment, a bank angle acquisition circuit for acquiring the bank angle φ of the vehicle is further provided, and the arithmetic circuit is configured to determine a vehicle speed at the rear-wheel tangential point from the wheel speed of the front wheel on the basis of the yaw rate and the bank angle φ.

In the present specification, the terms "detection" and "acquisition" are differentiated as follows, in principle.
(1) To "detect physical parameter a" means to obtain information concerning a value (measured value) of physical parameter a through measurement of physical parameter a.
(2) To "acquire physical parameter a" encompasses to "detect physical parameter a" and also to determine the value of physical parameter a based on information which is detected by a sensor or the like.

Moreover, "acquisition" may encompass the following operations, for example.
(2.1) calculating the value of physical parameter a by substituting a measured value into a predetermined arithmetic expression;
(2.2) referring to a table or a database which indicates correspondence between measured values and values of physical parameter a to read a value of physical parameter a corresponding to a measured value therefrom; and
(2.3) estimating a value of physical parameter a from the measured value.

For example, acquiring a yaw rate includes not only directly detecting a yaw rate by means of a yaw rate sensor, but also obtaining an estimated value of yaw rate with an arithmetic circuit which applies arithmetic operations to an output from elsewhere, e.g., an attitude angle sensor or a velocity sensor. This similarly applies to any physical parameter other than yaw rate, e.g., bank angle φ.

Note that, when a wheel speed is to be detected, a count value per unit time of the electric pulses which are output from a wheel speed sensor provided near the wheel axis are usually utilized as the wheel speed, these electric pulses being output in accordance with the rotation speed of the wheel. Although the count value is proportional to the wheel speed, this proportionality constant is usually not one, and therefore the count value is not equal to the value of wheel speed itself (i.e., velocity in a tangential direction on the outer peripheral surface of the wheel). However, the respective terms in the equation for calculating a slip rate λ or a slip amount are wheel speeds. Therefore, so long as the proportionality constant between the wheel speed and the count value is set to an identical value between the respective terms, count values may well be treated as wheel speeds.

Embodiment

Vehicle Speed Determination System

Hereinafter, with reference to FIG. 5, an exemplary basic construction of a vehicle speed determination system according to an embodiment of the present invention will be described.

Figure 5:
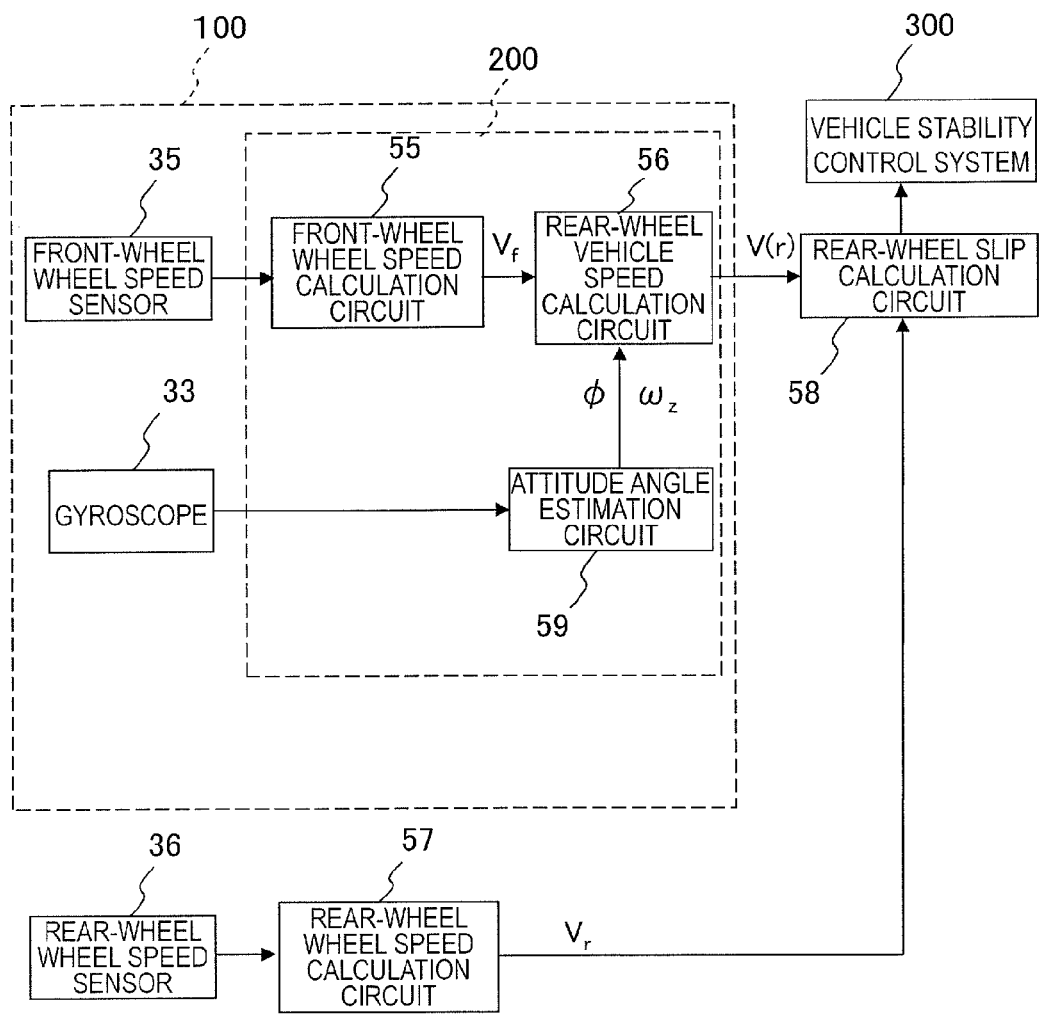
FIG. 5 is a block diagram showing an exemplary construction for a vehicle speed determination system according to an embodiment of the present invention.

The vehicle speed determination system 100 shown in FIG. 5 includes: a front-wheel wheel speed sensor 35 which detects a wheel speed of the front wheel; a gyroscope 33 which detects a yaw rate of the vehicle body; and an arithmetic unit 200 which acquires a vehicle speed at the rear-wheel tangential point based on the wheel speed of the front wheel and the yaw rate of the vehicle body. The calculated vehicle speed (e.g., V(r)) at the rear-wheel tangential point may be an expected speed at the rear-wheel tangential point. The actual speed (e.g., Vr) at the rear-wheel tangential point may be different than the expected vehicle speed, and would result in corrective steps (as described below) being taken by the vehicle stability control system 300. This may also apply to other embodiments described herein. In the illustrated example, the unit 200 includes an attitude angle estimation circuit 59 which estimates an attitude angle(s) (at least one of yaw angle, roll angle, and pitch angle) based on the output from the gyroscope 33.

The front-wheel wheel speed sensor 35 is placed near the front wheel, and outputs electric pulses at a frequency which is proportional to the rotation speed of the front wheel. Known wheel speed sensors are usable as the front-wheel wheel speed sensor 35. A front-wheel wheel speed calculation circuit 55 calculates a front-wheel wheel speed $V_f$ based on a count value per unit time of the electric pulses which are output from the front-wheel wheel speed sensor 35. The front-wheel wheel speed calculation circuit 55 supplies the front-wheel wheel speed $V_f$ to the rear-wheel vehicle speed calculation circuit 56.

On the other hand, the gyroscope 33 in this example detects a yaw rate (yaw angular velocity) $\omega_z$ and a roll rate (roll angular velocity), and inputs the detected values to the attitude angle estimation circuit 59. The attitude angle estimation circuit 59 estimates a bank angle (roll angle) φ from the yaw rate $\omega_z$ and roll rate, and supplies the yaw rate $\omega_z$ and the bank angle φ to the rear-wheel vehicle speed calculation circuit 56. The attitude angle estimation circuit 59 has the construction (including a Kalman filter) described in Patent Document 1, for example. The attitude angle estimation circuit 59 may acquire various measured values from sensors not shown in FIG. 5, or acquire the output from the front-wheel wheel speed sensor 35.

In the example shown in FIG. 5, the rear-wheel vehicle speed calculation circuit 56 previously stores values of f(φ) in eq. 1 in the form of a table or a function expression. Based on the yaw rate $\omega_z$ and the bank angle φ obtained from the attitude angle estimation circuit 59 and the front-wheel wheel speed $V_f$ obtained from the front-wheel wheel speed calculation circuit 55, the rear-wheel vehicle speed calculation circuit 56 calculates a vehicle speed V(r) (an expected vehicle speed) at the rear-wheel tangential point.

The rear-wheel slip amount calculation circuit 58 receives the vehicle speed V(r) at the rear-wheel tangential point which is output from the rear-wheel vehicle speed calculation circuit 56 and the rear-wheel wheel speed $V_r$ which is output from a rear-wheel wheel speed calculation circuit 57, and calculates a slip amount or slip rate of the rear wheel. Specifically, a difference between the vehicle speed V(r) at the rear-wheel tangential point and the rear-wheel wheel speed $V_r$ is calculated. As necessary, this difference is divided by the one of the vehicle speed V(r) and the rear-wheel wheel speed $V_r$ that has the greater absolute value.

The slip amount or slip rate thus obtained is supplied to the vehicle stability control system 300. The vehicle stability control system 300 may be a traction control system (TCS), an anti-lock braking system (ABS), or any other known attitude control system.

The arithmetic unit 200 in the present embodiment (or any other embodiment described herein) may be implemented as a known general-purpose digital signal processor or dedicated signal processing circuit. In some embodiments, the arithmetic unit 200 may be a single processor. Such a single processor executes pre-loaded computer program to perform various processes; by performing the processes simultaneously or sequentially, the processor functions as different components; each function of the processor implemented by such a process is illustrated as a separate circuit in the arithmetic circuit 200 in the figures. The arithmetic unit 200 may include integrated circuit devices and memories mounted on a substrate or substrates. Alternatively, the arithmetic unit 200 may be part of a computer which has other functional blocks such as the rear-wheel slip calculation circuit 58. What is important for the operation of the arithmetic unit 200 is that it is constructed so as to execute the aforementioned arithmetic operations, and the hardware of the arithmetic unit 200 itself may be known to a person of ordinary skill in the art. The arithmetic unit is also referred to as an "arithmetic circuit". The arithmetic unit 200 of any embodiments described herein may be constructed similarly to as described above.

Figure 6:
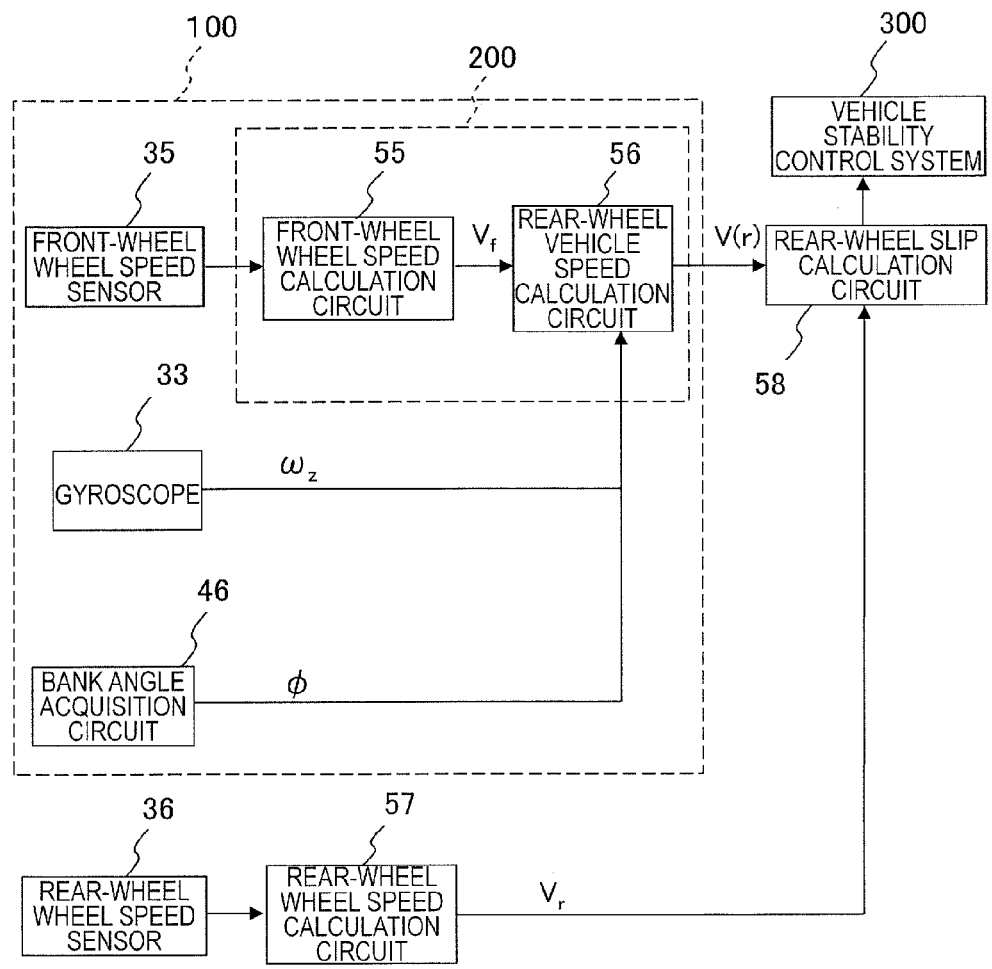
FIG. 6 is a block diagram showing another exemplary construction for a vehicle speed determination system according to an embodiment of the present invention.

The vehicle speed determination system 100 may include a bank angle acquisition circuit 46 as shown in FIG. 6. In this case, a bank angle φ is obtained from the bank angle acquisition circuit 46, and thus the attitude angle estimation circuit 59 shown in FIG. 5 is not essential. The bank angle acquisition circuit 46 may be constructed so as to acquire a bank angle based on a detection value of a distance meter which measures distance from the ground, or detect a bank angle through image processing in cooperation with a camera which images the front of the motorcycle 1.

Figure 7:
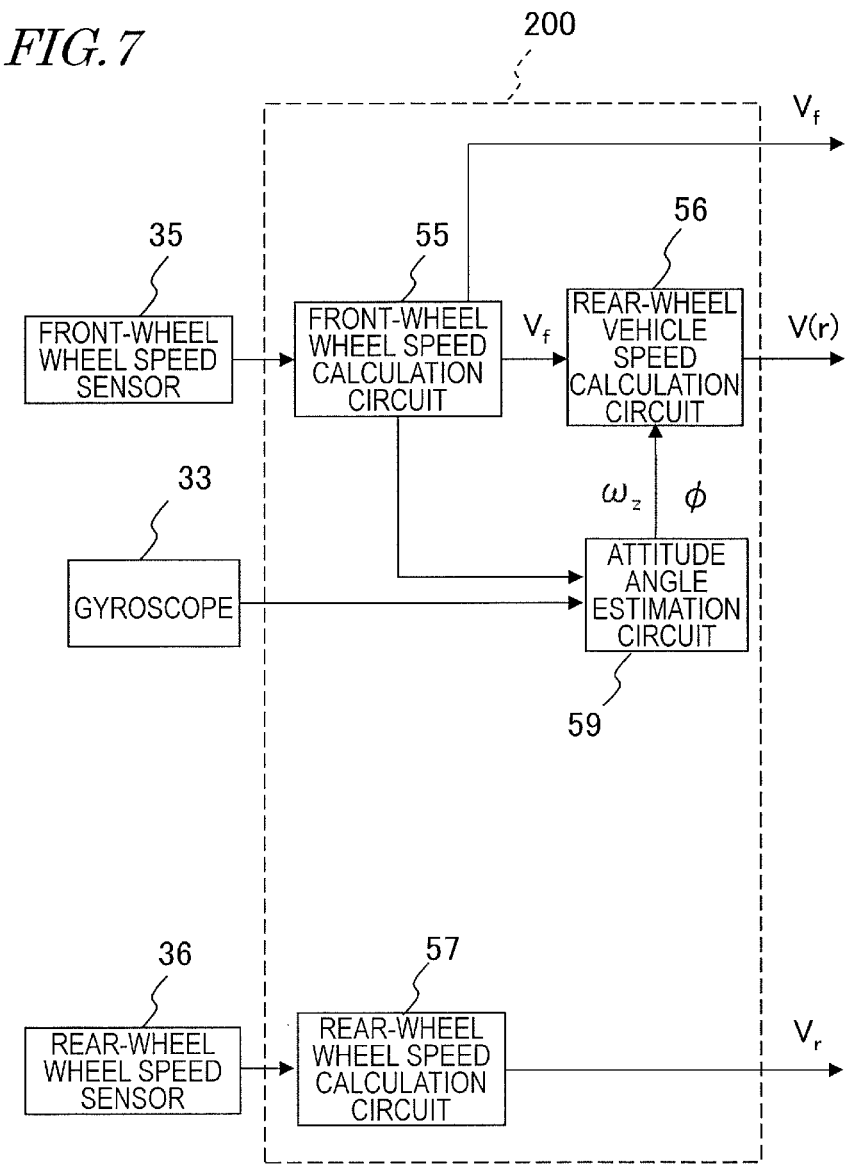
FIG. 7 is a block diagram showing still another exemplary construction for a vehicle speed determination system according to an embodiment of the present invention.

As shown in FIG. 7, the arithmetic unit 200 may include a rear-wheel wheel speed calculation circuit 57 which receives a signal from the rear-wheel wheel speed sensor 36 to calculate a rear-wheel wheel speed $V_r$. In this case, the arithmetic unit 200 receives outputs from both of the front-wheel wheel speed sensor 35 and the rear-wheel wheel speed sensor 36, and is able to output various kinds of "vehicle speeds", including the front-wheel wheel speed $V_f$ and the rear-wheel wheel speed $V_r$. These "vehicle speeds" may also be utilized for stability control of the vehicle, other than calculation of the slip rate or slip amount.

Figure 8:
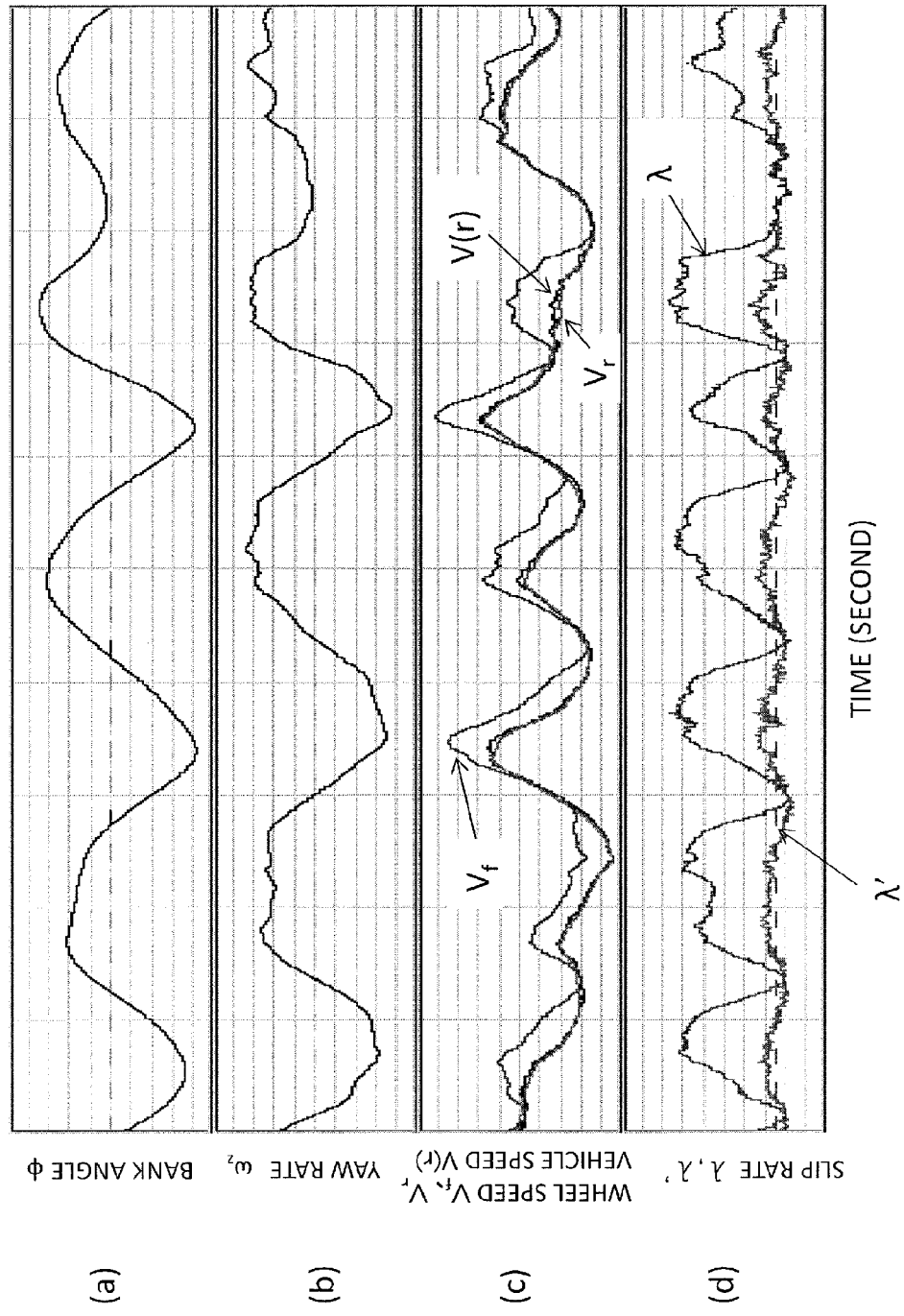
FIG. 8 includes graphs showing temporal change of: (a) a bank angle $\phi$ of a motorcycle which travels in a meandering manner with steering maneuver; (b) a yaw rate $\omega_z$ at that time; (c) wheel speeds $V_f$ and $V_r$ of the front and rear wheels and a vehicle speed V(r) at a rear-wheel tangential point; and (d) a slip rate $\lambda$ determined by a conventional technique and a slip rate $\lambda'$ determined according to the present embodiment.

FIG. 8(a) is a graph showing temporal change of the bank angle φ of a motorcycle which travels in a meandering manner with steering maneuver; FIG. 8(b) is a graph showing temporal change of the yaw rate $\omega_z$ at that time; FIG. 8(c) is a graph showing temporal change of the wheel speeds $V_f$ and $V_r$ of the front and rear wheels and the vehicle speed V(r) at the rear-wheel tangential point; and FIG. 8(d) is a graph showing temporal change of a slip rate λ determined by a conventional technique and a slip rate λ' determined according to the present embodiment. The bank angle φ, the yaw rate $\omega_z$, and the wheel speeds $V_f$ and $V_r$ are all actually-measured values, whereas the vehicle speed V(r) at the rear-wheel tangential point and the slip rates λ and λ' are calculated values. As is clear from FIG. 8(d), the slip rate λ' which is obtained according to the present embodiment exhibits a value (maximum of about 5%) that is closer to zero than is the slip rate λ (maximum of 21%) obtained by the conventional technique.

Figure 9:
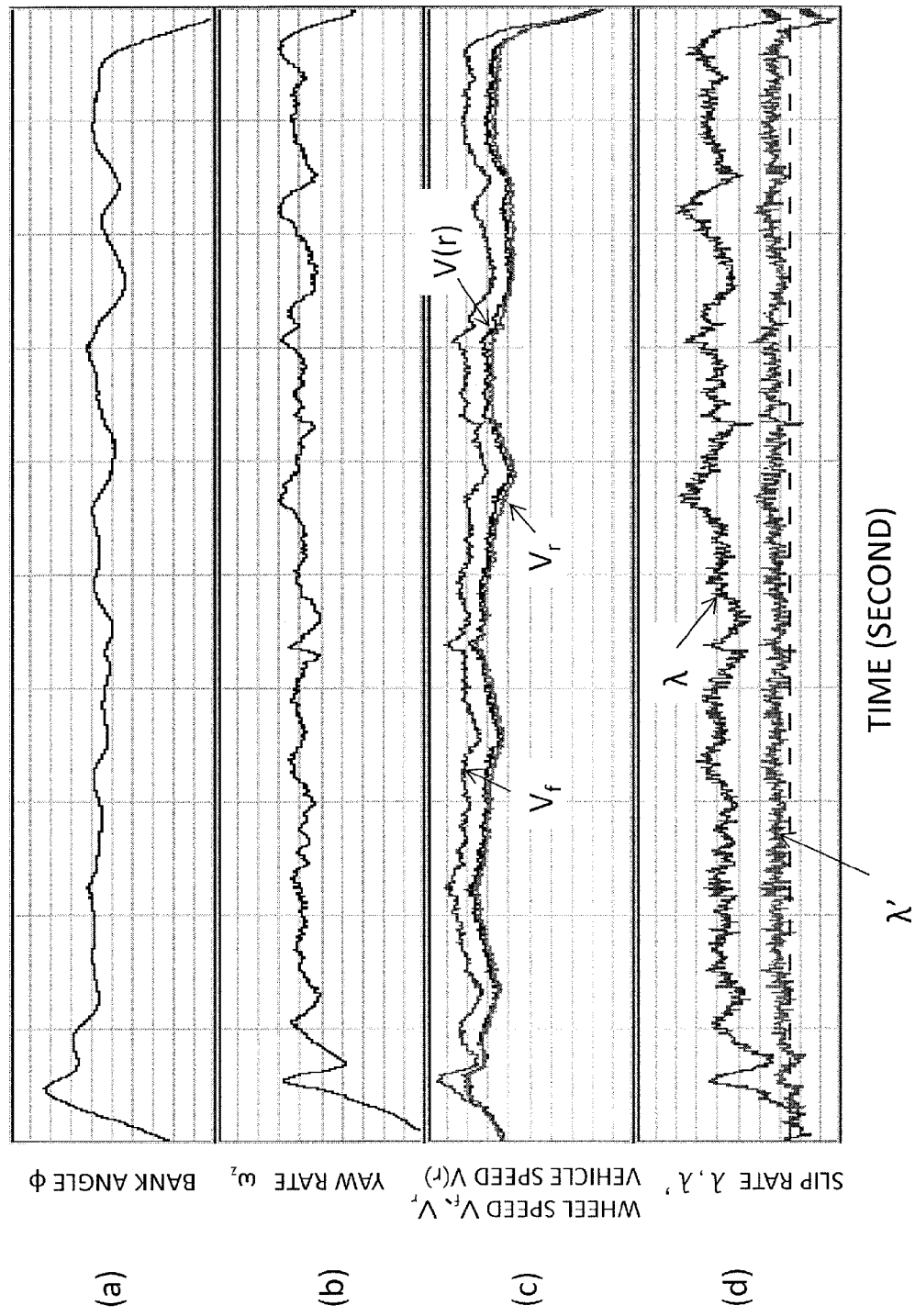
FIG. 9 includes graphs showing temporal change of: (a) a bank angle $\phi$ of a motorcycle which travels in a manner of pivoting in one direction through steering maneuver; (b) a yaw rate $\omega_z$ at that time; (c) wheel speeds $V_f$ and $V_r$ of the front and rear wheels and a vehicle speed V(r) at a rear-wheel tangential point; and (d) a slip rate $\lambda$ determined by a conventional technique and a slip rate $\lambda'$ determined according to the present embodiment.

FIG. 9(a) is a graph showing temporal change of the bank angle φ of a motorcycle which undergoes steady circular turning in one direction with steering maneuver; FIG. 9(b) is a graph showing temporal change of the yaw rate $\omega_z$ at that time; FIG. 9(c) is a graph showing temporal change of the wheel speeds $V_f$ and $V_r$ of the front and rear wheels and the vehicle speed V(r) at the rear-wheel tangential point; and FIG. 9(d) is a graph showing temporal change of a slip rate λ determined by a conventional technique and a slip rate λ' determined according to the present embodiment. The bank angle φ, the yaw rate $\omega_z$, and the wheel speeds $V_f$ and $V_r$ are all actually-measured values, whereas the vehicle speed V(r) at the rear-wheel tangential point and the slip rates λ and λ' are calculated values. During turning, the bank angle was about 20° and the yaw rate was about 60°/second. As is clear from FIG. 9(d), the slip rate λ' which is obtained according to the present embodiment exhibits a value (maximum of about 4%) that is closer to zero than is the slip rate λ (maximum of about 10%) determined by the conventional technique.

Thus, with the vehicle speed determination system according to the present embodiment, even if the vehicle speed does not match between the front-wheel tangential point and the rear-wheel tangential point, a vehicle speed at the rear-wheel tangential point can be acquired from the wheel speed of the front wheel, whereby a slip rate during curving can be obtained.

The vehicle speed determination system according to the present invention can be used for purposes other than determining a slip rate or slip amount, as has been mentioned earlier. The reason is that a vehicle speed at the rear-wheel tangential point during curving may occasionally be needed also in generic vehicle stability control systems. Even if the vehicle includes a wheel speed sensor for the rear wheel, the rear wheel may undergo a wheelspin on poor terrain whose friction coefficient μ is small, thus making it difficult to determine a vehicle speed at the rear-wheel tangential point. For such reasons, the vehicle speed determination system according to the present invention is useful for various vehicle stability control systems.

Although the present embodiment illustrates that the "vehicle speed at the rear-wheel tangential point" is calculated as the "vehicle speed", it would also be possible to obtain a "vehicle speed at the barycenter of the vehicle" by modifying the calculation formula. In other words, with the vehicle speed determination system according to the present invention, it is also possible to determine a vehicle speed at an arbitrary site on the vehicle.

Next, a motorcycle as an embodiment of a saddled vehicle having the vehicle speed determination system will be described. In the following description, front/rear, or front-rear direction, and right/left, or right-left direction, are referenced to the direction in which the motorcycle makes a forward travel. So a right-left direction would be perpendicular to the front-rear direction and the direction of the forward travel.

1. Schematic Construction of the Motorcycle

Figure 10:
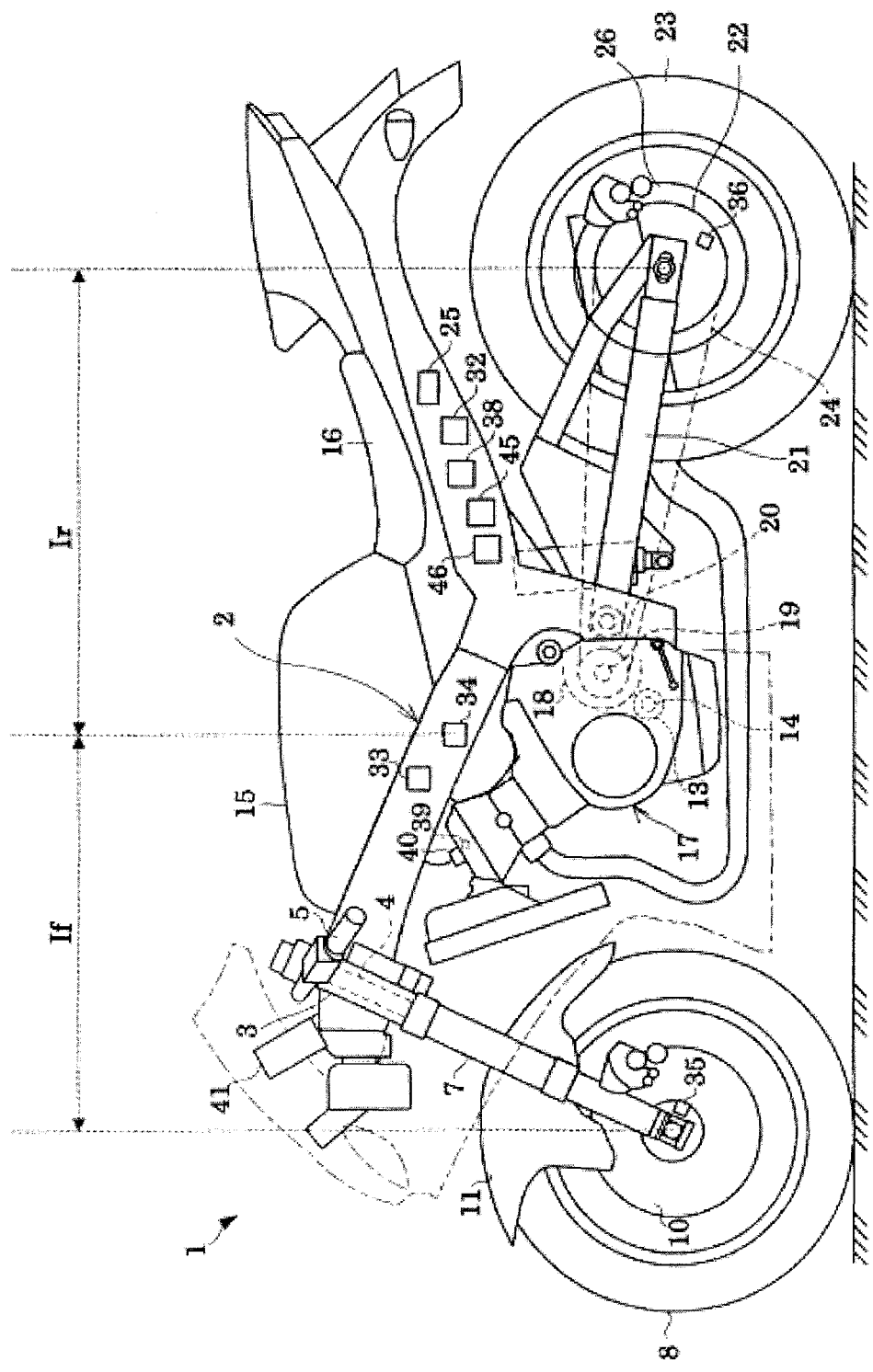
FIG. 10 is a side view of a motorcycle according to an embodiment of the present invention.

FIG. 10 is a side view showing a schematic construction of a motorcycle having a stability control system according to the present embodiment. The motorcycle 1 includes a main frame 2. A head pipe 3 is provided at an upper portion of the front end of the main frame 2. A steering shaft 4 is inserted in the head pipe 3. Handle bars 5 are linked at an upper end of the steering shaft 4. A brake lever (not shown) is provided on the right handle bar 5.

At a lower end of the steering shaft 4, a pair of front forks 7 which are capable of contraction and expansion are linked. This allows the front forks 7 to swing with the turning of the handle bars 5. A front wheel 8 is rotatably attached at lower ends of the front forks 7. Vibration of the front wheel 8 is absorbed by the contraction and expansion of the front forks 7. A front wheel brake 10 is attached at lower ends of the front forks 7, so that rotation of the front wheel 8 is braked with manipulation of the brake lever. A front wheel cover 11 is fixed to the front forks 7, above the front wheel 8.

A fuel tank 15 and a seat 16 are retained at an upper portion of the main frame 2 so as to flank each other in the front-rear direction. An engine 17 and a transmission 18 are retained by the main frame 2, below the fuel tank 15. A clutch 13 and a clutch actuator 14 for engaging or disengaging the clutch 13 are provided between the engine 17 and the transmission 18. The transmission 18 includes a drive shaft 19 for outputting motive power generated in the engine 17. A drive sprocket 20 is linked to the drive shaft 19. Output of the motive power generated by the engine 17 to the drive shaft 19 is allowed or disallowed by the clutch 13.

A swing arm 21 is swingingly supported at the lower rear of the main frame 2. At a rear end of the swing arm 21, a driven sprocket 22 and a rear wheel 23 are rotatably supported. A rear wheel brake 26 which is operated by a brake pedal (not shown) is provided on the rear wheel 23. A chain 24 is suspended between the drive sprocket 20 and the driven sprocket 22. The motive power generated by the engine 17 is transmitted to the rear wheel 23 via the clutch 13, the transmission 18, the drive shaft 19, the drive sprocket 20, the chain 24, and the driven sprocket 22.

Below the seat 16, an ECU (Electronic Control Unit) 25 for controlling the operation of each section of the motorcycle 1 is provided. The brake pressure to the front wheel brake 10 and the rear wheel brake 26 is controlled by a brake modulator 38, in accordance with manipulation of the brake lever and the brake pedal. On the main frame 2, a gyroscope 33, a lateral acceleration sensor 34, a vehicle speed calculation circuit 45, and a bank angle acquisition circuit 46 are provided.

2. Construction of the Stability Control System

Figure 11:
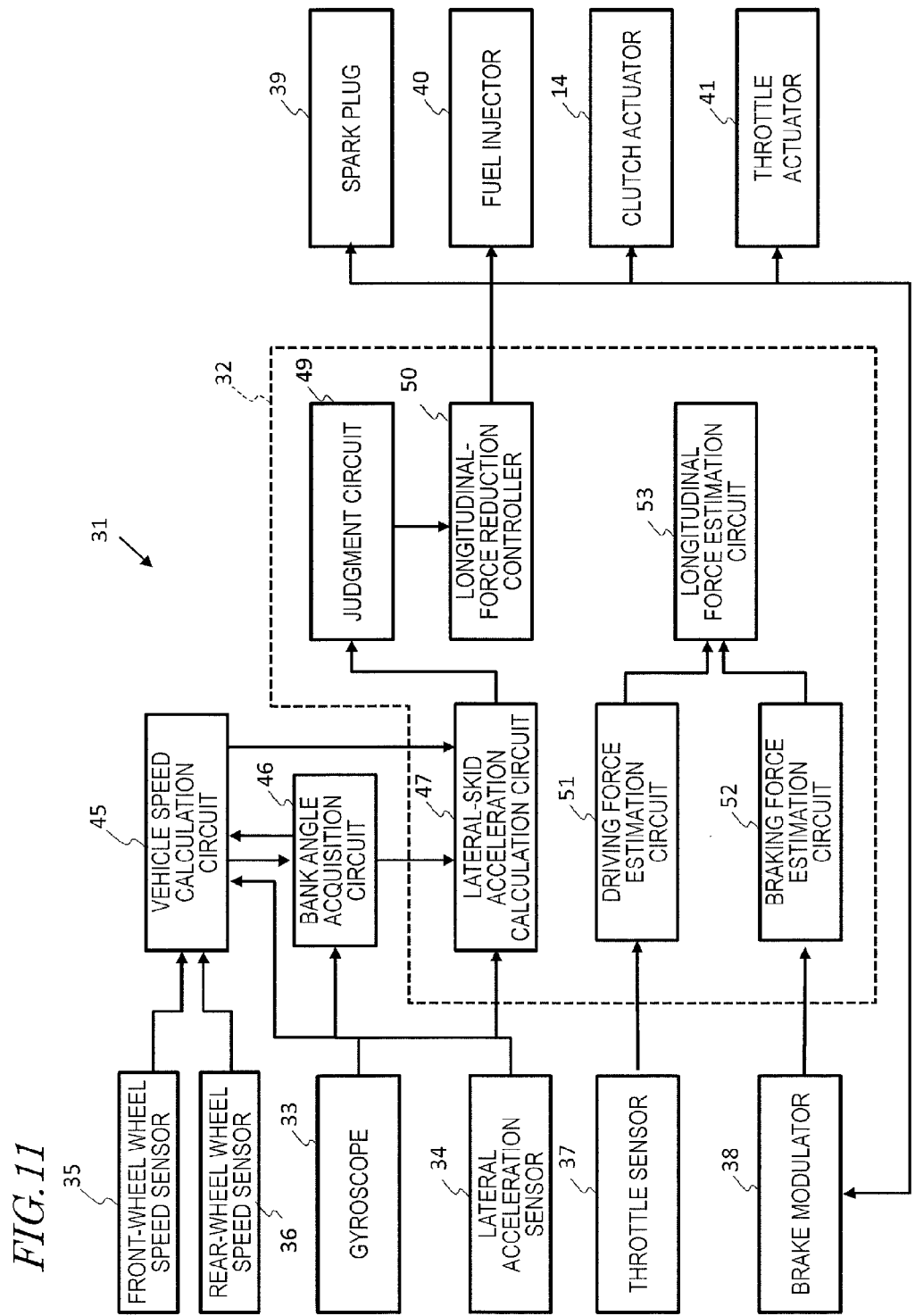
FIG. 11 is a functional block diagram showing the construction of a stability control system according to an embodiment of the present invention.

Next, the construction of the stability control system of the saddled vehicle will be described with reference to FIG. 11. FIG. 11 is a functional block diagram showing the construction of the stability control system 31 according to the present embodiment. The stability control system 31 includes a longitudinal force controller 32, the gyroscope 33, the lateral acceleration sensor 34, the front-wheel wheel speed sensor 35, the rear-wheel wheel speed sensor 36, a throttle sensor 37, the brake modulator 38, the vehicle speed calculation circuit 45, and the bank angle acquisition circuit 46. Some elements of the stability control system 31 may be included in the ECU 25. Upon detecting a lateral skid of the front wheel 8 or the rear wheel 23, the longitudinal force controller 32 reduces longitudinal force on the wheel. The details will be described later.

When curving, as the rider steers the handle bars 5 of the motorcycle 1, the yaw rate of the motorcycle 1 changes. Moreover, as the rider tilts the vehicle body of the motorcycle 1 toward the center of the curve, the roll rate and the bank angle (roll angle) of the motorcycle 1 change. The gyroscope 33 in the present embodiment detects angular velocities along the two axial directions of yaw and roll of the motorcycle 1. In other words, the gyroscope 33 detects a yaw rate and a roll rate of the motorcycle 1. The detected angular velocity values along these two axes are sent from the gyroscope 33 to the vehicle speed calculation circuit 45, the bank angle acquisition circuit 46, and the longitudinal force controller 32. The vehicle speed calculation circuit 45 in the present embodiment is composed of the arithmetic unit 200 having the construction which has been described with reference to FIG. 7, for example, and is able to calculate not only a vehicle speed at the front-wheel tangential point, but also a vehicle speed at the rear-wheel tangential point. In this embodiment, a vehicle speed at the rear-wheel tangential point is determined through the above-described arithmetic operations based on the front-wheel wheel speed, the yaw rate, and the bank angle.

The gyroscope 33 in the present embodiment corresponds to the yaw rate sensor according to the present invention, and also functions as a roll rate sensor. In addition to a yaw rate and a roll rate, the gyroscope 33 may be configured to also detect a pitch rate.

The lateral acceleration sensor 34 detects an acceleration in the lateral direction of the vehicle body of the motorcycle 1. The detected value of lateral acceleration is sent from the lateral acceleration sensor 34 to the longitudinal force controller 32 and the bank angle acquisition circuit 46. The front-wheel wheel speed sensor 35 detects a rotation speed of the front wheel 8. The rear-wheel wheel speed sensor 36 detects a rotation speed of the rear wheel 23. The detected rotation speeds of the front wheel 8 and the rear wheel 23 are output to the vehicle speed calculation circuit 45.

The throttle sensor 37 detects a position of the throttle. The detected value of throttle position is output to the longitudinal force controller 32. The brake modulator 38 detects brake pressures on the front wheel brake 10 and the rear wheel brake 26, and adjusts the respective brake pressures. The detected respective brake pressures of the wheels are output to the longitudinal force controller 32.

3. Construction of the Longitudinal Force Controller

Next, an exemplary construction of the longitudinal force controller 32 in the present embodiment will be described. The longitudinal force controller 32 in the present embodiment may be implemented as a known general-purpose digital signal processor or dedicated signal processing circuit. In some embodiments, the longitudinal force controller 32 may be a single processor. In some embodiments, the arithmetic unit 200 may be a single processor. Such a single processor executes pre-loaded computer program to perform various processes; by performing the processes simultaneously or sequentially, the processor functions as different components; each function of the processor implemented by such a process is illustrated as a separate circuit in the longitudinal force controller 32 in the figures. Longitudinal force controller 32 may include integrated circuit devices and memories mounted on a substrate or substrates. Alternatively, the longitudinal force controller 32 may be part of a computer which has other functional blocks. What is important for the operation of the longitudinal force controller 32 is that it is constructed so as to execute the described operations, and the hardware of the longitudinal force controller 32 itself may be known to a person of ordinary skill in the art.

As shown in FIG. 11, the gyroscope 33, the lateral acceleration sensor 34, the throttle sensor 37, the brake modulator 38, the vehicle speed calculation circuit 45, and the bank angle acquisition circuit 46 are connected to the inputs of the longitudinal force controller 32. To the outputs of the longitudinal force controller 32, the clutch actuator 14, the brake modulator 38, a spark plug 39, a fuel injector 40, and a throttle actuator 41 are connected.

The longitudinal force controller 32 includes a lateral-skid acceleration calculation circuit 47, a judgment circuit 49, a longitudinal-force reduction controller 50, a driving force estimation circuit 51, a braking force estimation circuit 52, and a longitudinal force estimation circuit 53. The longitudinal force controller 32 in the present embodiment detects the lateral skid of each wheel independently, and performs control to reduce the longitudinal force applied to each wheel when a lateral skid is detected. Next, an exemplary operation of determining presence or absence of a lateral skid will be described.

3.1 Lateral Skid Determination

In order to detect a lateral skid of each wheel, in this embodiment, a lateral-skid acceleration (or degree of slip) is acquired based on the vehicle speed, bank angle, lateral acceleration, and yaw rate of the motorcycle 1. The vehicle speed calculation circuit 45 can acquire vehicle speeds of the motorcycle 1 (i.e., the vehicle speed at the front-wheel tangential point and the vehicle speed at the rear-wheel tangential point) through the above-described arithmetic operations based on the outputs of the front-wheel wheel speed sensor 35, the gyroscope 33, and the bank angle acquisition circuit 46. The vehicle speeds obtained at the vehicle speed calculation circuit 45 are output to the lateral-skid acceleration calculation circuit 47. The "vehicle speed" which is used by the bank angle acquisition circuit 46 of the present embodiment in making a bank angle estimation does not need to be the vehicle speed at the rear-wheel tangential point, but may be the vehicle speed at the front-wheel tangential point. As described earlier, a difference which is in accordance with the yaw rate and the bank angle occurs between the vehicle speed at the rear-wheel tangential point and the vehicle speed at the front-wheel tangential point. Even by ignoring this difference, estimation errors for the bank angle can be made sufficiently small.

To the bank angle acquisition circuit 46 in the present embodiment, the roll rate of the motorcycle 1 is input from the gyroscope 33, and also the lateral acceleration of the motorcycle 1 is input from the lateral acceleration sensor 34. Based on these input values and the "vehicle speed", the bank angle acquisition circuit 46 determines a bank angle of the motorcycle 1. The bank angle can be acquired through various methods. For example, the bank angle (roll angle) may be estimated by the method described in Patent Document 1.

In order to enhance the accuracy of bank angle estimation, an initially estimated value of bank angle may be used for the arithmetic operations to derive a vehicle speed at the rear-wheel tangential point, and the vehicle speed (the vehicle speed at the rear-wheel tangential point) which is obtained through these arithmetic operations may then be used to again estimate a bank angle. By repeating these estimations, the accuracy of estimation can be enhanced.

Figure 12:
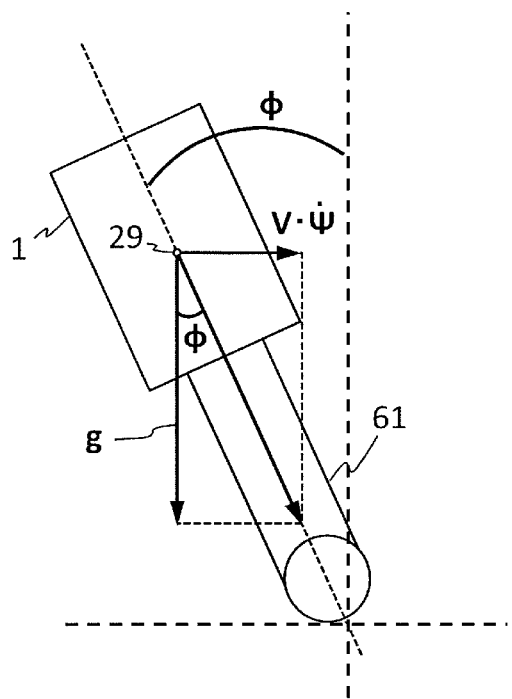
FIG. 12 is an explanatory diagram for explaining bank angle calculation according to an embodiment of the present invention.
Figure 13:
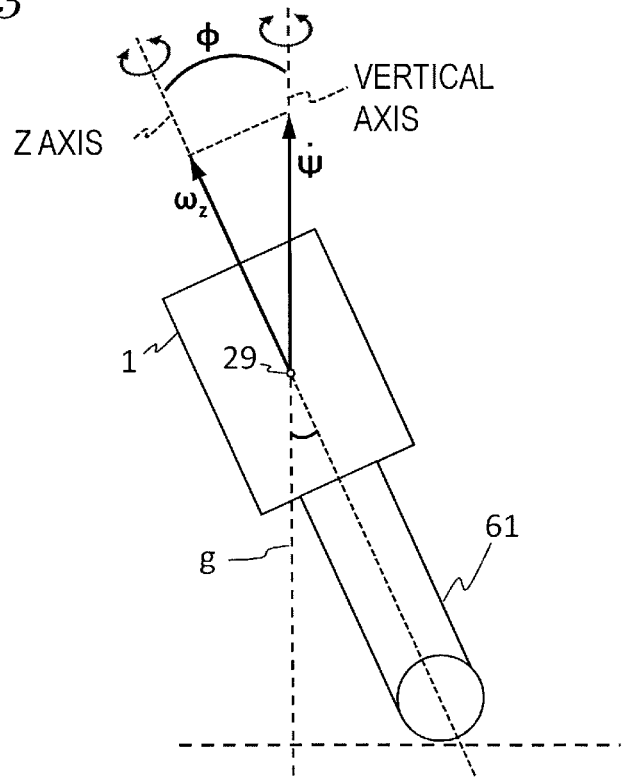
FIG. 13 is another explanatory diagram for explaining bank angle calculation according to an embodiment of the present invention.

With reference to FIG. 12 and FIG. 13, an exemplary method of acquiring a bank angle according to the present embodiment will be described.

FIG. 12 is a diagram schematically illustrating acceleration occurring at the barycenter 29 of the motorcycle 1. FIG. 13 is a schematic illustration of angular velocities occurring in the motorcycle 1, and is conveniently shown in such a manner that the fixed axis of the vehicle body (Z axis) passes through the barycenter 29. This method of bank angle detection is a method of detection in an ideal state of turning at a velocity V while ignoring the pitching of the vehicle body and the tire thickness, under a lean-with state. Note that a lean-with state is a state where the upper body of the rider and the fixed axis of the vehicle body (Z axis) are on the same line.

As can be seen from FIG. 12, the relationship between the bank angle φ, the vehicle speed V, a time derivative of Euler's yaw angle Ψ, and the acceleration of gravity g during turning is expressed by the following equation, where (dΨ/dt) is a yaw rate (yaw angular velocity) as a time derivative of the yaw angle.

$$\phi = \arctan(V \cdot (d\Psi/dt)/g) \quad (1)$$

As can be seen from FIG. 13, the relationship between the bank angle φ, the output value $\omega_z$ of the yaw rate sensor which is fixed on the vehicle body, and a time derivative of Euler's yaw angle Ψ during turning is expressed by the following equation. In FIG. 13, $\omega_z$ is an angular velocity occurring around a top-bottom axis fixed on the vehicle body (Z axis: the fixed axis of the vehicle body), whose magnitude is represented by the length of the arrow. (dΨ/dt) is an angular velocity occurring around the vertical axis.

$$\phi = \arccos(\omega_z/(d\Psi/dt)) \quad (2)$$

From equation (1) and equation (2), a relational expression as follows is derived.

$$\phi = \arcsin(V \cdot \omega_z/g) \quad (3)$$

The lateral-skid acceleration calculation circuit 47 calculates a lateral-skid acceleration occurring in each wheel, based on the vehicle speed V, the bank angle φ, the yaw rate, and the lateral acceleration. The lateral-skid acceleration is calculated by the following equations, for example. Note that dfy/dt represents a lateral-skid acceleration occurring in the front wheel 8; dry/dt represents a lateral-skid acceleration occurring in the rear wheel 23; and Ay represents a detection value of the lateral acceleration sensor 34. If represents a horizontal distance between the position at which the lateral acceleration sensor 34 is attached and the center of the front wheel 8; and Ir represents a horizontal distance between the position at which the lateral acceleration sensor 34 is attached and the center of the rear wheel 23 (see FIG. 10).

$$dfy/dt = -V \cdot \omega_z \cdot \sec\phi - g \cdot \tan\phi + Ay \cdot \sec\phi + If \cdot d\omega_z/dt \cdot \sec\phi \quad (4)$$

$$dry/dt = -V \cdot \omega_z \cdot \sec\phi - g \cdot \tan\phi + Ay \cdot \sec\phi - Ir \cdot d\omega_z/dt \cdot \sec\phi \quad (5)$$

In the case where the roll rate is also detected for calculating a lateral-skid acceleration, the following equations may be used for the calculation, for example. wr represents a detected value of roll rate.

$$dfy/dt = -V \cdot \omega_z \cdot \sec\phi - g \cdot \tan\phi + Ay \cdot \sec\phi + If \cdot d\omega_z/dt \cdot \sec\phi + If \cdot wr \cdot \omega_z \cdot \tan\phi \cdot \sec\phi \quad (6)$$

$$dry/dt = -V \cdot \omega_z \cdot \sec\phi - g \cdot \tan\phi + Ay \cdot \sec\phi - Ir \cdot d\omega_z/dt \cdot \sec\phi - Ir \cdot wr \cdot \omega_z \cdot \tan\phi \cdot \sec\phi \quad (7)$$

The respective detected lateral-skid accelerations of the front wheel 8 and the rear wheel 23 are output to the judgment circuit 49.

The judgment circuit 49 performs a comparison as to whether an input lateral-skid acceleration exceeds a predetermined threshold $G_1$ or not. If the lateral-skid acceleration value is equal to or greater than the threshold $G_1$ as illustrated in FIG. 14(a), then it determines that a lateral skid is occurring in the wheel in question, and, as shown in FIG. 14(b), outputs to the longitudinal-force reduction controller 50 a longitudinal-force reduction control signal for reducing the longitudinal force acting on the wheel. Note that the threshold $G_1$ may be set to different values between the front wheel 8 and the rear wheel 23. Note that the sign of lateral-skid acceleration indicates the right-left direction; when the sign is minus, the comparison is to be made against a threshold $-G_1$. In other words, the need for reduction of longitudinal force is determined by comparing the absolute value of lateral-skid acceleration against the threshold $G_1$.

3.2 Longitudinal Force Estimation

Based on the detection value of the throttle sensor 37, the driving force estimation circuit 51 estimates a driving force occurring in the driving wheel. Since the driving wheel is the rear wheel 23 in the present embodiment, no driving force occurs in the front wheel 8. The driving force of the rear wheel 23 as estimated by the driving force estimation circuit 51 is output to the longitudinal force estimation circuit 53.

Based on the brake pressure detected by the brake modulator 38, the braking force estimation circuit 52 estimates the braking force occurring in each wheel. The estimated braking force of each wheel is output to the longitudinal force estimation circuit 53.

Based on the input driving force and braking force, the longitudinal force estimation circuit 53 calculates a longitudinal force on each wheel. The calculated longitudinal force on each wheel is output to the longitudinal-force reduction controller 50.

3.3 Longitudinal-Force Reduction

Based on the judgment signal which is input from the judgment circuit 49, the longitudinal-force reduction controller 50 performs control to reduce the longitudinal force acting on each wheel, as input from the longitudinal force estimation circuit 53. If the driving force is greater than the braking force, control is performed to decrease the driving force or increase the braking force. If the braking force is greater than the driving force, control is performed to decrease the braking force or increase the driving force.

Figure 15A:
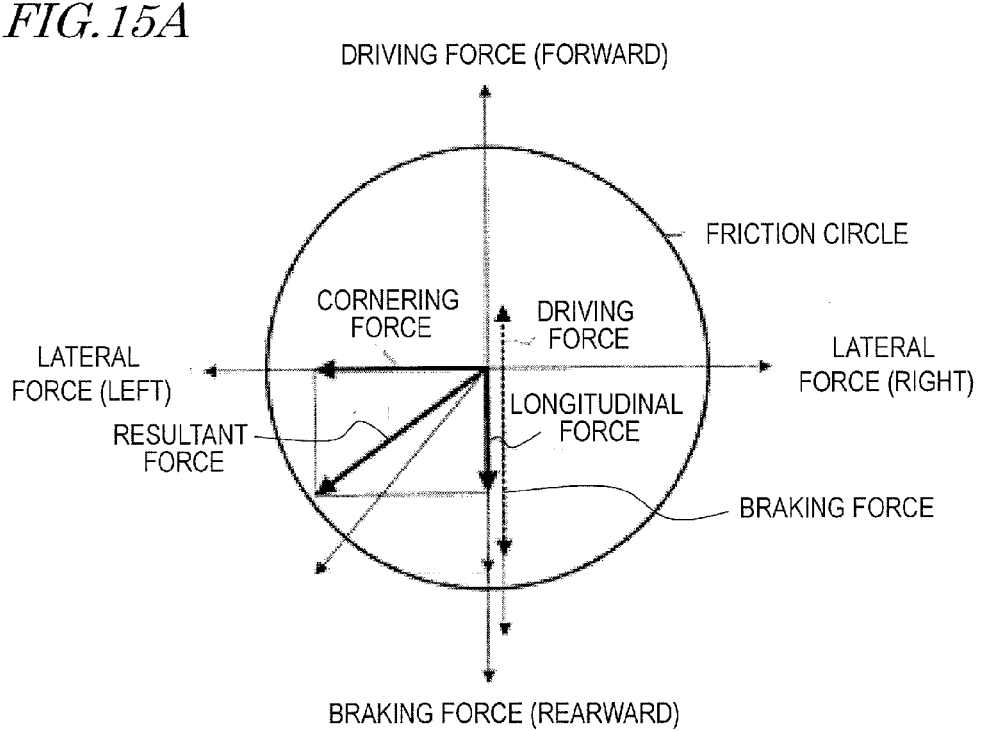
FIGS. 15A and 15B are diagrams showing relationships between forces acting on a wheel and a friction circle according to an embodiment.
Figure 15B:
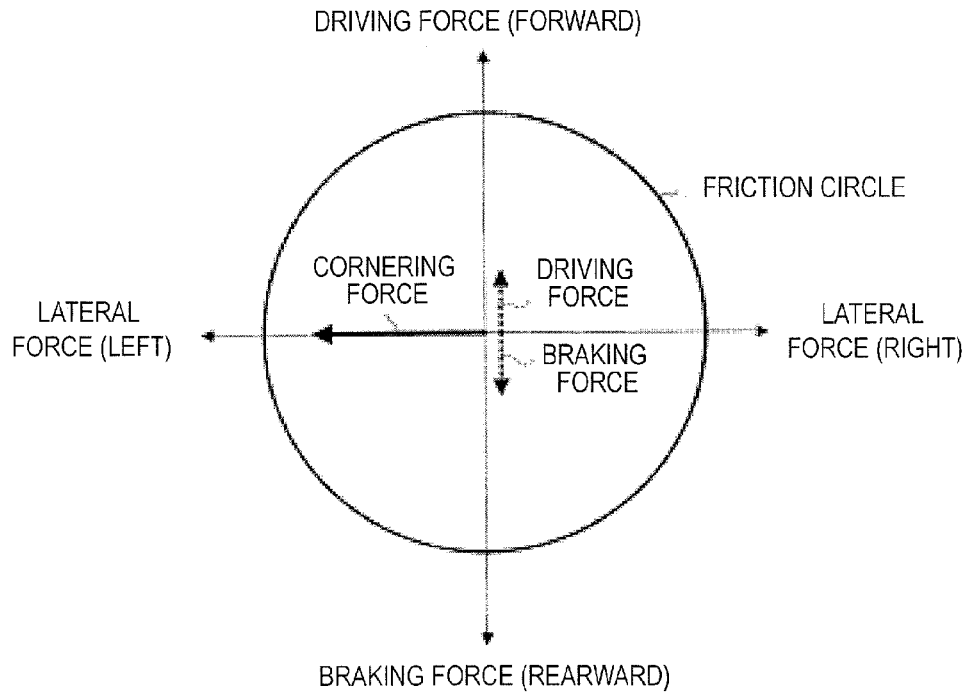

For example, as shown in FIG. 15A, if the resultant force extends outside the friction circle, causing a lateral skid to occur in the motorcycle 1, the braking force is decreased to reduce the longitudinal force, which is a sum of the driving force and the braking force. That is, the longitudinal force may be the sum of forces along a front-rear direction acting on the front wheel or the rear wheel. As a result of this, the resultant force of the cornering force (lateral force) and the longitudinal force fits within the friction circle, whereby lateral skidding can be stopped. Furthermore, as shown in FIG. 15B, control may be performed to equalize the driving force and the braking force in magnitude, so that the longitudinal force becomes zero, thus allowing the range of the friction circle to be allocated to the lateral force. Thus, a maximum allowance can be given as to cornering force.

When decreasing the driving force to reduce the longitudinal force, the longitudinal-force reduction control circuit 50 applies ignition curtailment control to the spark plug 39 to reduce the ignition frequency, etc., or delay the ignition timing. Other than that, driving force can be decreased by controlling the fuel injector 40 to reduce or eliminate the injected amount of fuel. Alternatively, driving force can be decreased by controlling the clutch actuator 14 to disengage the clutch 13. When increasing the driving force to reduce the longitudinal force, the longitudinal-force reduction control circuit 50 may control the fuel injector 40 to increase the injected amount of fuel, thus increasing the driving force. In the case where an electronic throttle is provided, control may be performed to open the throttle, thus increasing the driving force.

When increasing or decreasing the braking force to reduce the longitudinal force, the brake modulator 38 is controlled to increase or decrease brake pressure. Alternatively, the throttle may be closed to generate engine braking, thus increasing the braking force. When engine braking is occurring, the throttle may conversely opened to reduce the engine braking, thus decreasing the braking force. The amount by which to increase or decrease the driving force and the braking force is controlled in accordance with the magnitude of longitudinal force, which is input from the longitudinal force estimation circuit 53. Thus, when a lateral skid occurs in each wheel, the lateral skid may be independently detected in the respective wheel, and the longitudinal force composed of the driving force and the braking force can be reduced independently for the respective wheel, thus maximizing the allowance for gripping force in the lateral direction. As a result, the attitude of the motorcycle 1 can be controlled even during curving.

4. Longitudinal-Force Reduction Control Operation

Figure 16:
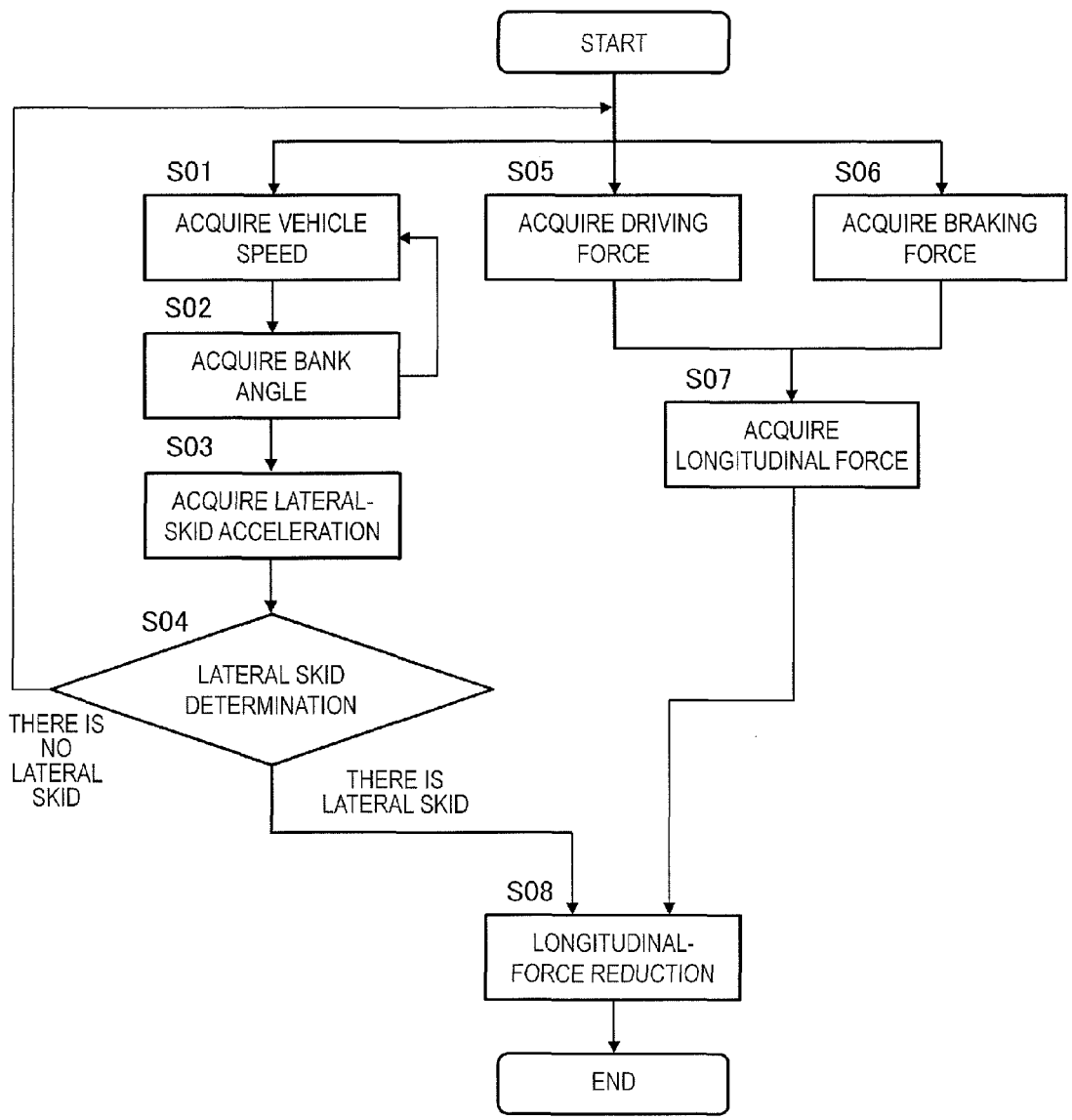
FIG. 16 is a flowchart illustrating stability control according to an embodiment.

Next, an exemplary control operation of the longitudinal force controller 32 will be described with reference to FIG. 16. FIG. 16 is a flowchart showing an example of a longitudinal force control operation.

When the motorcycle 1 is at a curve, the rider will travel through the curve while banking the vehicle body of the motorcycle 1. The front-wheel wheel speed sensor 35 and the rear-wheel wheel speed sensor 36 incessantly detect the wheel speeds of the front wheel 8 and the rear wheel 23, and acquires the wheel speed of the front wheel as a vehicle speed needed to acquire the bank angle (step S01). In addition to the above wheel speed, the bank angle acquisition circuit 46 according to the present embodiment also relies on the yaw rate which is input from the gyroscope 33 and the lateral acceleration which is input from the lateral acceleration sensor 34 to calculate the bank angle of the motorcycle 1 (step S02).

Next, based on the thus-calculated bank angle and the yaw rate input from the gyroscope 33, a vehicle speed at the rear-wheel tangential point is acquired from the vehicle speed at the front-wheel tangential point (front-wheel wheel speed) (step S01). Once the vehicle speeds of the front and rear wheels are thus obtained, since the barycenter position with respect to the front- and rear-wheel tangential points is clear, it is also possible to calculate a vehicle speed at the barycenter. The bank angle value may be again calculated by using the new value of vehicle speed. As necessary, these steps S01 and S02 may be repeated to enhance the accuracy of estimation for the vehicle speed and bank angle.

Next, based on the vehicle speed, bank angle, yaw rate, and lateral acceleration, the lateral-skid acceleration calculation circuit 47 calculates a lateral-skid acceleration occurring in each wheel (step S03). The calculated lateral-skid acceleration is compared against a predetermined threshold $G_1$ to determine whether a lateral skid has occurred or not (step S04). When the absolute value of the lateral-skid acceleration is equal to or greater than the threshold $G_1$, it is determined that the wheel in question "has" a lateral skid. If the absolute value of the lateral-skid acceleration is less than the threshold $G_1$, it is determined that the wheel in question does not have a lateral skid, and again various state functions of the motorcycle 1 are detected. The threshold for determining the presence or absence of a lateral skid is not limited to the example shown in FIG. 14.

Concurrently with steps S01 to S04, the driving force occurring at each wheel is estimated to thereby acquire the driving force (step S05). Driving force estimation may be conducted by the driving force estimation circuit 51 in accordance with the throttle position based on the throttle sensor 37, for example. Moreover, concurrently with steps S01 to S05, the braking force occurring at each wheel may be estimated to thereby acquire the braking force (step S06). Braking force estimation may be conducted by the braking force estimation circuit 52 in accordance with the brake pressure of each wheel as detected by the brake modulator 38.

Based on the estimated driving force and braking force, the longitudinal force estimation circuit 53 estimates the longitudinal force composed of the driving force and the braking force occurring at each wheel (step S07). Since the driving force and the braking force are in mutually opposite directions, the longitudinal force can be estimated by subtracting the braking force from the driving force. Thus, the longitudinal force can be acquired.

If a lateral skid determination is made that there exists a lateral skid, the longitudinal force occurring in the wheel which is determined as having a lateral skid is input from the longitudinal force estimation circuit 53, in order to decrease the longitudinal force which the magnitude of longitudinal force (step S08). Since longitudinal force reduction is to be controlled so that the driving force and the braking force balance out, an increase or decrease in the driving force or an increase or decrease in the braking force is made in accordance with the magnitudes of the driving force and the braking force relative to each other. An example of increasing the driving force may be increasing the fuel to be injected from the fuel injector 40. An example of decreasing the driving force may be decreasing the fuel to be injected from the fuel injector 40, suspend ignition or delay the ignition timing of the spark plug 39, or disengage the clutch actuator 14 so as to prevent engine torque from being transmitted to the rear wheel 23. An example of increasing or decreasing the braking force may be increasing or decreasing the brake pressure based on the brake modulator 38.

Thus, according to an embodiment of the present invention, a vehicle speed can be acquired not only at the front-wheel tangential point but also at the rear-wheel tangential point, even while the motorcycle 1 is making a curve. Therefore, the longitudinal force controller 32 can independently control the longitudinal force composed of the driving force and the braking force occurring in each wheel, thus enabling attitude control during a curve.

According to the present embodiment, when calculating a lateral-skid acceleration occurring in each wheel based on a lateral acceleration, a yaw rate, a velocity of travel, a bank angle, and a roll rate during a curve, it is possible to acquire a lateral-skid acceleration that takes the bank angle into account. Therefore, the accuracy of estimation for the lateral-skid acceleration is enhanced.

In the motorcycle 1 according to the present embodiment, the driving force and the braking force, which occur in parallel to the direction of travel of each wheel, are controlled to balance out, whereby the resultant force of the driving force and the braking force is reduced. Since this makes it possible to allocate the entire allowance for gripping force of the wheel to cornering force, it helps to maintain the attitude of the motorcycle 1 while curving.

The lateral acceleration of the motorcycle 1 may be detected by using the GPS, instead of the lateral acceleration sensor 34. Instead of using an engine as the motive power source, an electric motor may be adopted as the motive power source. In this case, the increase or decrease in the driving force and the braking force can also be controlled by an increase or decrease in the motor torque.

The saddled vehicle according to the present invention is not limited to a motorcycle, but may be any vehicle that is capable of travelling while banking. The bank angle acquisition circuit may perform its arithmetic operations by using a detected value of roll rate in addition to detected values of vehicle speed, yaw rate, and lateral acceleration. In the case where the motorcycle includes a CVT (Continuously Variable Transmission), the transmission ratio may be varied to increase or decrease torque, thereby reducing the longitudinal force.

The vehicle speed determination system according to the present invention is broadly applicable to saddled vehicles having a front wheel and a rear wheel. The present vehicle speed determination system can be broadly used in attitude control techniques for motorcycles, such as a traction control system (TCS) and an anti-lock braking system (ABS).

The present invention, or the pertinent component, may take the form of an entirely hardware embodiment, an entirely software embodiment (including firmware, resident software, micro-code, etc.) or an embodiment combining software and hardware aspects that may all generally be referred to herein as a "circuit," "module" or "system."

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2013-214463 filed on Oct. 15, 2013, the entire contents of which are hereby incorporated by reference.

What is claimed is:

1. A vehicle speed determination system for a vehicle having a front wheel and a rear wheel, comprising:
a wheel speed sensor configured to detect a wheel speed of the front wheel; and
an arithmetic circuit configured to determine an expected vehicle speed at a rear-wheel tangential point, based on the wheel speed of the front wheel, and
an expected difference in vehicle speed between a front-wheel tangential point and the rear-wheel tangential point due to a difference between a locus of travel of the front wheel and a locus of travel of the rear wheel,
wherein the arithmetic circuit determines the expected difference in the vehicle speed between the front-wheel tangential point and the rear-wheel tangential point based on a yaw rate of the vehicle.

2. The vehicle speed determination system of claim 1, further comprising a yaw rate sensor configured to detect the yaw rate of the vehicle and communicate the yaw rate to the arithmetic circuit.

3. The vehicle speed determination system of claim 1, further comprising a bank angle acquisition circuit configured to acquire a bank angle of the vehicle and communicate the bank angle to the arithmetic circuit,
wherein based on both the yaw rate and the bank angle, the arithmetic circuit determines the expected vehicle speed at the rear-wheel tangential point from the wheel speed of the front wheel.

4. The vehicle speed determination system of claim 1, wherein, the arithmetic circuit is responsive to the yaw rate being substantially zero by regarding the wheel speed of the front wheel as the vehicle speed at the rear-wheel tangential point.

5. The vehicle speed determination system of claim 4, wherein the arithmetic circuit calculates the expected vehicle speed at the rear-wheel tangential point according to equation 1:

$$V(r) = \sqrt{V_f^2 - (f(\phi) \cdot \omega_z)^2}$$

wherein in the equation 1,
V(r) is the expected vehicle speed at the rear-wheel tangential point;
$V_f$ is the wheel speed of the front wheel;
$\phi$ is a bank angle of the vehicle;
$\omega_z$ is the yaw rate of the vehicle; and
$f(\phi)$ is a predetermined function of the bank angle $\phi$.

6. The vehicle speed determination system of claim 1, wherein the vehicle speed determination system further comprises:
a rear-wheel slip amount calculation circuit receiving the expected vehicle speed at the rear-wheel tangential point and an actual vehicle speed at the rear wheel to determine a slip amount or a slip rate; and
a vehicle stability control system receiving the slip amount or the slip rate and controlling an attitude control system based upon the slip amount or the slip rate.

7. The vehicle speed determination system of claim 1, wherein the arithmetic circuit is a digital signal processor or a dedicated signal processing circuit.

8. A stability control system for a vehicle having a front wheel and a rear wheel, the stability control system comprising:
a first wheel speed sensor configured to detect a wheel speed of the front wheel;
a second wheel speed sensor configured to detect a wheel speed of the rear wheel;
an arithmetic circuit configured to determine a vehicle speed at a front-wheel tangential point and a vehicle speed at a rear-wheel tangential point, based on
the wheel speed of the front wheel,
a difference in vehicle speed between the front-wheel tangential point and the rear-wheel tangential point due to a difference between a locus of travel of the front wheel and a locus of travel of the rear wheel; and
a longitudinal force controller configured to adjust an absolute value of a longitudinal force based on the vehicle speeds at the front-wheel tangential point and the rear-wheel tangential point, the longitudinal force being a sum of forces along a front-rear direction of the vehicle acting on the front wheel or the rear wheel.

9. The stability control system of claim 8, wherein the arithmetic circuit determines a difference in vehicle speed between the front-wheel tangential point and the rear-wheel tangential point based on a yaw rate of the vehicle.

10. The stability control system of claim 8, further comprising a yaw rate sensor configured to detect a yaw rate of the vehicle and communicate the yaw rate to the arithmetic circuit.

11. The stability control system of claim 9, further comprising a bank angle acquisition circuit configured to acquire a bank angle of the vehicle, wherein
based on the wheel speed of the front wheel, the wheel speed of the rear wheel, the yaw rate and the bank angle of the vehicle, the arithmetic circuit determines a value which defines a degree of slip of the rear wheel.

12. The stability control system of claim 11, further comprising a lateral acceleration acquisition circuit configured to acquire a lateral acceleration, the lateral acceleration being an acceleration along a right-left direction acting on the vehicle,
   wherein based on the lateral acceleration and the bank angle, the longitudinal force controller reduces the absolute value of the longitudinal force acting on the front wheel or the rear wheel.

13. The stability control system of claim 12, wherein the longitudinal force controller acquires lateral-skid accelerations of the front wheel and the rear wheel based on the lateral acceleration and the bank angle, and reduces the absolute value of the longitudinal force acting on the front wheel or the rear wheel in accordance with a magnitude of the lateral-skid accelerations.

14. The stability control system of claim 13, further comprising a lateral acceleration sensor,
   wherein the lateral acceleration acquisition circuit acquires the lateral acceleration based on a detection value of the lateral acceleration sensor; and
   the longitudinal force controller reduces the absolute value of the longitudinal force acting on the front wheel or the rear wheel based on the yaw rate, the vehicle speed at the rear-wheel tangential point, the lateral acceleration, and the bank angle.

15. The stability control system of claim 14, wherein the longitudinal force controller acquires a roll rate of the vehicle, and reduces the absolute value of the longitudinal force acting on the front wheel or the rear wheel based on the roll rate.

16. A saddled vehicle comprising the stability control system of claim 8.

17. The stability control system of claim 8, wherein the arithmetic circuit is a digital signal processor or a dedicated signal processing circuit.

18. A vehicle speed determination method for a vehicle having a front wheel and a rear wheel, the method comprising:
   detecting a wheel speed of the front wheel; and
   determining an expected vehicle speed at a rear-wheel tangential point, based on
      the wheel speed of the front wheel, and
      an expected difference in vehicle speed between a front-wheel tangential point and the rear-wheel tangential point due to a difference between a locus of travel of the front wheel and a locus of travel of the rear wheel,
      wherein the expected difference in the vehicle speed between the front-wheel tangential point and the rear-wheel tangential point is based on a yaw rate of the vehicle.

19. The method of claim 18, wherein a digital signal processor or a dedicated signal processing circuit performs the step of determining.

* * * * *